US012789207B2

(12) United States Patent
Kulkarni et al.

(10) Patent No.: US 12,789,207 B2
(45) Date of Patent: Nov. 10, 2026

(54) SPRAY NOZZLE DEVICE FOR DELIVERING A RESTORATIVE COATING THROUGH A HOLE IN A CASE OF A TURBINE ENGINE

(71) Applicant: General Electric Company, Schenectady, NY (US)

(72) Inventors: Ambarish Jayant Kulkarni, Glenville, NY (US); Hrishikesh Keshavan, Watervliet, NY (US); Mehmet Dede, Cincinnati, OH (US); Bernard Patrick Bewlay, Niskayuna, NY (US); Guanghua Wang, Clifton Park, NY (US); Byron Pritchard, Cincinnati, OH (US); Michael Solomon Idelchik, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 215 days.

(21) Appl. No.: 18/221,677

(22) Filed: Jul. 13, 2023

(65) Prior Publication Data

US 2024/0157382 A1 May 16, 2024

Related U.S. Application Data

(63) Continuation of application No. 17/360,567, filed on Jun. 28, 2021, now Pat. No. 11,745,195, which is a (Continued)

(51) Int. Cl.

*B05B 7/04* (2006.01)
*B05B 1/04* (2006.01)

(Continued)

(52) U.S. Cl.

CPC .............. *B05B 7/045* (2013.01); *B05B 1/046* (2013.01); *B05B 7/0012* (2013.01); *B05B 7/0475* (2013.01); *B05B 7/0884* (2013.01)

(58) Field of Classification Search

CPC ........... B05B 1/20; B05B 1/046; B05B 7/045; B05B 7/046; B05B 7/0012; B05B 7/0475; B05B 7/0884; B05B 15/658

(Continued)

(56) References Cited

U.S. PATENT DOCUMENTS 1,240,032 A * 9/1917 Schneider .............. B23Q 1/015 82/149
1,245,346 A * 11/1917 Humphrey ................ B05B 1/14 239/550

(Continued)

FOREIGN PATENT DOCUMENTS

CN 1242716 A 1/2000
CN 101351868 1/2009

(Continued)

OTHER PUBLICATIONS

U.S. Appl. No. 16/557,317; Final Rejection mailed Jun. 10, 2022; (pp. 1-6).

(Continued)

*Primary Examiner* — Jason J Boeckmann
(74) *Attorney, Agent, or Firm* — Fitch, Even, Tabin & Flannery LLP

(57) ABSTRACT

An atomizing spray nozzle device includes an atomizing zone housing that receives different phases of materials used to form a coating. The atomizing zone housing mixes the different phases of the materials into a two-phase mixture of ceramic-liquid droplets in a carrier gas. The device also includes a plenum housing fluidly coupled with the atomizing housing and extending from the atomizing housing to a delivery end. The plenum housing includes an interior plenum that receives the two-phase mixture of ceramic-liquid droplets in the carrier gas from the atomizing zone housing. The device also includes one or more delivery nozzles fluidly coupled with the plenum chamber. The (Continued)

delivery nozzles provide outlets from which the two-phase mixture of ceramic-liquid droplets in the carrier gas is delivered onto one or more surfaces of a target object as the coating on the target object.

20 Claims, 19 Drawing Sheets

Related U.S. Application Data continuation of application No. 15/835,762, filed on Dec. 8, 2017, now Pat. No. 11,161,128, which is a continuation-in-part of application No. 15/812,617, filed on Nov. 14, 2017, now Pat. No. 10,710,109.

(51) Int. Cl.
*B05B 7/00* (2006.01)
*B05B 7/08* (2006.01)

(58) Field of Classification Search
USPC ........................... 239/416.4, 416.5, 550, 398
See application file for complete search history.

(56) References Cited

U.S. PATENT DOCUMENTS

| | | | |
|---|---|---|---|
| 1,562,095 A | 11/1925 | Kadel | |
| 3,567,116 A | 3/1971 | Lindlof | |
| 3,747,851 A | 7/1973 | Conrad | |
| 3,956,566 A | 5/1976 | Van Gils | |
| 3,987,668 A | 10/1976 | Popenoe | |
| 4,014,961 A | 3/1977 | Popov | |
| 4,195,779 A | 4/1980 | Auclair | |
| 4,483,695 A | 11/1984 | Covey, Jr. | |
| 4,483,698 A | 11/1984 | Kuechenthal | |
| 4,562,095 A | 12/1985 | Coulon | |
| 4,714,199 A | 12/1987 | Heath | |
| 4,819,878 A | 4/1989 | Bailey | |
| 4,893,752 A | 1/1990 | Spink | |
| 4,950,497 A | 8/1990 | Gillette | |
| 5,041,301 A | 8/1991 | Gillette | |
| 5,256,352 A | 10/1993 | Snyder | |
| 5,427,317 A | 6/1995 | Huettlin | |
| 5,484,107 A | 1/1996 | Holmes | |
| 5,553,784 A | 9/1996 | Theurer | |
| 5,618,001 A | 4/1997 | Del Gaone | |
| 6,010,077 A | 1/2000 | Casey | |
| 6,010,746 A | 1/2000 | Descoteaux | |
| 6,021,635 A | 2/2000 | Gaag | |
| 6,214,943 B1 | 4/2001 | Newton | |
| 6,569,245 B2 | 5/2003 | Krysa | |
| 6,827,039 B1 * | 12/2004 | Nelson ................. | A01K 13/001 401/285 |
| 6,916,416 B2 | 7/2005 | Adamson | |
| 7,112,758 B2 | 9/2006 | Ma | |
| 7,509,735 B2 | 3/2009 | Philip | |
| 8,221,825 B2 | 7/2012 | Reitz | |
| 8,356,482 B2 | 1/2013 | Duval | |
| 8,356,882 B2 | 1/2013 | Saito | |
| 8,590,812 B2 | 11/2013 | Wurz | |
| 8,758,502 B2 | 6/2014 | Nienburg | |
| 9,010,663 B2 | 4/2015 | Fenton | |
| 9,096,763 B2 | 8/2015 | Belov | |
| 9,138,766 B2 | 9/2015 | Ströhlein | |
| 9,296,549 B2 | 3/2016 | Ghavami-Nasr | |
| 9,403,244 B2 | 8/2016 | Rautenberg | |
| 9,421,508 B2 | 8/2016 | Bedetti | |
| 9,494,050 B2 | 11/2016 | Schnoebelen | |
| 9,956,566 B2 | 5/2018 | Okada | |
| 9,987,668 B2 | 6/2018 | Kjellberg | |
| 10,710,109 B2 | 7/2020 | Kulkarni | |
| 10,987,684 B2 | 4/2021 | Gullicks | |
| 11,161,128 B2 | 11/2021 | Kulkarni | |
| 11,534,780 B2 | 12/2022 | Kulkarni | |
| 2003/0041801 A1 | 3/2003 | Hehmann | |
| 2003/0077384 A1 | 4/2003 | Krysa | |
| 2004/0098989 A1 | 5/2004 | Mansour | |
| 2005/0235493 A1 | 10/2005 | Philip | |
| 2006/0040048 A1 | 2/2006 | Han | |
| 2007/0063072 A1 | 3/2007 | Ganan Calvo | |
| 2007/0221746 A1 | 9/2007 | Heinrich | |
| 2009/0025425 A1 | 1/2009 | Weinhold | |
| 2009/0121039 A1 | 5/2009 | Van Den Berg | |
| 2010/0178428 A1 | 7/2010 | Vermeire | |
| 2011/0147491 A1 | 6/2011 | Pope | |
| 2011/0192910 A1 | 8/2011 | Bedetti | |
| 2013/0134232 A1 | 5/2013 | Wang | |
| 2013/0174869 A1 | 7/2013 | Roesing | |
| 2014/0110504 A1 * | 4/2014 | Honeyands ........... | B05B 7/0892 239/418 |
| 2014/0180283 A1 | 6/2014 | Morgan | |
| 2014/0290568 A1 | 10/2014 | Aoki | |
| 2015/0048176 A1 | 2/2015 | Jones | |
| 2015/0086333 A1 | 3/2015 | Schnoebelen | |
| 2015/0174544 A1 | 6/2015 | Bedetti | |
| 2015/0209915 A1 | 7/2015 | Rautenberg | |
| 2017/0218763 A1 | 8/2017 | Diwinsky | |
| 2018/0154281 A1 | 6/2018 | Engstrand | |
| 2018/0154381 A1 | 6/2018 | Bewlay | |
| 2019/0143350 A1 | 5/2019 | Kulkarni | |
| 2019/0143358 A1 | 5/2019 | Kulkarni | |
| 2019/0381524 A1 | 12/2019 | Kulkarni | |
| 2020/0215559 A1 | 7/2020 | Fukanuma | |
| 2021/0323008 A1 | 10/2021 | Kulkarni | |

FOREIGN PATENT DOCUMENTS

| | | |
|---|---|---|
| CN | 101547730 A | 9/2009 |
| CN | 101890486 A | 11/2010 |
| CN | 104624424 A | 5/2015 |
| CN | 104696052 A | 6/2015 |
| CN | 204448385 U | 7/2015 |
| CN | 105307787 A | 2/2016 |
| CN | 105374687 A | 3/2016 |
| CN | 105612004 A | 5/2016 |
| CN | 105612052 A | 5/2016 |
| CN | 106170347 A | 11/2016 |
| CN | 109926215 A | 6/2019 |
| CN | 109939851 A | 6/2019 |
| DE | 10315839 A1 | 12/2006 |
| EP | 0117472 A2 | 9/1984 |
| EP | 1813352 A1 | 8/2007 |
| EP | 3202526 A1 | 8/2017 |
| EP | 2027934 B1 | 10/2017 |
| EP | 3483394 A1 | 5/2019 |
| EP | 3495047 A1 | 6/2019 |
| EP | 3680023 A1 | 7/2020 |
| JP | 2008253889 A | 10/2008 |
| KR | 101332896 B1 | 11/2013 |
| WO | 2017040314 A1 | 3/2017 |

OTHER PUBLICATIONS

U.S. Appl. No. 16/557,317; Notice of Allowance and Fees Due (PTOL-85) mailed Sep. 16, 2022; (pp. 1-9).

U.S. Appl. No. 17/360,567; Final Rejection mailed Mar. 31, 2023; (pp. 1-6).

U.S. Appl. No. 17/360,567; Non-Final Rejection mailed Nov. 9, 2022; (pp. 1-11).

U.S. Appl. No. 17/360,567; Notice of Allowance and Fees Due (PTOL-85) mailed Jun. 14, 2023; (pp. 1-6).

U.S. Patent and Trademark Office, Notice of Allowance and Reasons for Allowance, U.S. Appl. No. 15/812,617, May 27, 2020, 9 pages.

U.S. Patent and Trademark Office, Office Action, U.S. Appl. No. 15/812,617, 10 pages, Oct. 30, 2019.

U.S. Patent and Trademark Office, Office Action, U.S. Appl. No. 15/812,617, 11 pages, Apr. 5, 2019.

U.S. Patent and Trademark Office, Office Action, U.S. Appl. No. 16/557,317, Aug. 26, 2021, 14 pages.

(56) References Cited

OTHER PUBLICATIONS

U.S. Patent and Trademark Office, Office Action, U.S. Appl. No. 16/557,317, Jan. 6, 2022, 12 pages.
U.S. Patent and Trademark Office, Office Action, U.S. Appl. No. 16/557,317, Mar. 18, 2021, 9 pages.

* cited by examiner

SPRAY NOZZLE DEVICE FOR DELIVERING A RESTORATIVE COATING THROUGH A HOLE IN A CASE OF A TURBINE ENGINE

CROSS-REFERENCE TO RELATED APPLICATIONS

This application is a continuation of U.S. patent application Ser. No. 17/360,567, which was filed on Jun. 28, 2021, which is a continuation of U.S. patent application Ser. No. 15/835,762,—granted as U.S. Pat. No. 11,161,128—which was filed on Dec. 8, 2017, entitled "SPRAY NOZZLE DEVICE FOR DELIVERING A RESTORATIVE COATING THROUGH A HOLE IN A CASE OF A TURBINE ENGINE," which was a continuation-in-part of U.S. patent application Ser. No. 15/812,617—granted as U.S. Pat. No. 10,710,109—which was filed on Nov. 14, 2017, all of which are incorporated herein by reference.

FIELD

The subject matter described herein relates to devices and systems used to apply or restore coatings inside machines, such as turbine blades or other components of turbine engines.

BACKGROUND

Many types of machines have protective coatings applied to interior components of the machines. For example, turbine engines may have thermal barrier coatings (TBC) applied to blades, nozzles, and the like, on the inside of the engines. These coatings can deteriorate over time due to environmental conditions in which the engines operate, wear and tear on the coatings, etc. Unchecked deterioration of the coatings can lead to significant damage to the interior components of the engines.

The outer casings or housings of turbine engines usually do not provide large access openings to the interior of the casings or housings. Because these coatings may be on the surfaces of components on the inside of the engines, restoring these coatings can require disassembly of the engines to reach the coatings. Disassembly of the engines can involve significant expense and time, and can result in systems relying on the engines (e.g., stationary power stations, aircraft, etc.) being out of service for a long time.

Some spray devices that restore coatings can be inserted into the small openings in the casings or housings without disassembling the engines, but these spray devices usually operate by moving the spray devices or components in the spray devices in order to apply the different components of the coatings. This movement can be difficult to control and can make it very difficult to apply an even, uniform restorative coating on interior surfaces of the engines.

BRIEF DESCRIPTION

In one embodiment, an atomizing spray nozzle device includes an atomizing zone housing portion configured to receive different phases of materials used to form a coating. The atomizing zone housing is shaped to mix the different phases of the materials into a two-phase mixture of ceramic-liquid droplets in a carrier gas. The device also includes a plenum housing portion fluidly coupled with the atomizing housing portion and extending from the atomizing housing portion to a delivery end. The plenum housing portion includes an interior plenum chamber that is elongated along a center axis. The plenum is configured to receive the two-phase mixture of ceramic-liquid droplets in the carrier gas from the atomizing zone. The device also includes one or more delivery nozzles fluidly coupled with the plenum chamber. The one or more delivery nozzles provide one or more outlets from which the two-phase mixture of ceramic-liquid droplets in the carrier gas is delivered onto one or more surfaces of a target object as a coating on the target object.

In one embodiment, a system includes the atomizing spray nozzle device and an equipment controller configured to control rotation of a turbine engine into which the atomizing spray nozzle device is inserted during spraying of the two-phase mixture of ceramic-liquid droplets in the carrier gas by the atomizing spray nozzle device into the turbine engine.

In one embodiment, a system includes the atomizing spray nozzle device and a spray controller configured to control one or more of a pressure of a two-phase mixture of ceramic-liquid droplets in a carrier gas provided to the atomizing spray nozzle device, a pressure of a gas provided to the atomizing spray nozzle device, a flow rate of the slurry provided to the atomizing spray nozzle device, a flow rate of the gas provided to the atomizing spray nozzle device, a temporal duration at which the slurry is provided to the atomizing spray nozzle device, a temporal duration at which the gas is provided to the atomizing spray nozzle device, a time at which the slurry is provided to the atomizing spray nozzle device, or a time at which the gas provided to the atomizing spray nozzle device.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
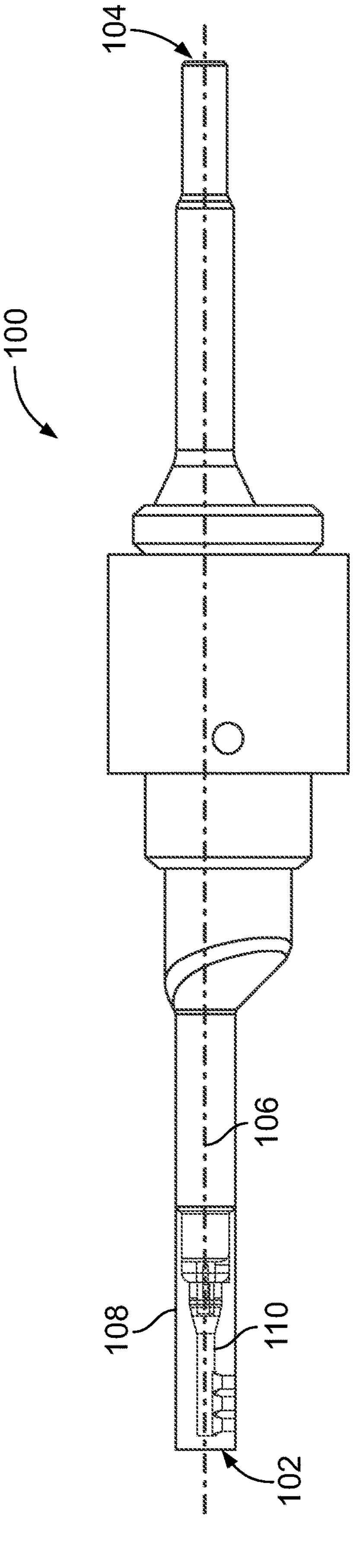
FIG. 1 illustrates one embodiment of a spray access tool.

One or more embodiments of the inventive subject matter described herein provide novel access tools and atomizing spray devices for producing a restorative coating for a turbine engine. The spraying access tool and spray nozzle devices possess unique and novel features that provide a restoration coating within a turbine engine without disassembly of the turbine engine. The spraying access tool, fluid delivery system, and spray nozzle devices can be employed through an access port in a turbine engine, such as a borescope port. The plugs for borescope parts can be easily removed and replaced with relatively little disruption to the operation of the turbine engine. A spray system includes a spray nozzle device for applying a restoration coating of, for example, a thermal barrier coating. While the description herein focuses on use of the spray system, access tool, and nozzle devices to apply restorative coatings on interior surfaces of turbine engines, the system, tool, and/or devices can be used to apply other, different coatings on interior or other surfaces of turbine engines, and/or can be used to apply coatings onto other surfaces of other machines. Unless specifically limited to turbine engines, thermal barrier coatings, or interior surfaces of turbine engines, not all embodiments described and claimed herein are so limited.

One or more embodiments of the spray devices described herein can be used to apply a spray coating that provides a chemical barrier coating to improve the resistance of the coating to attack by compounds such as calcium-magnesium alumino silicate. The chemical barrier coating also may provide some thermal improvement because of the thermal resistance of the spray coating. The chemical barrier coating can be applied in the field, in the overhaul shop, or even as a treatment to new components. Optionally, other coatings could be applied with the spray system and nozzle devices described herein.

One or more embodiments of the spraying access tool and spray nozzle device are designed to be employed inside a turbine engine at a fixed location that is set by the design of the spray access tool, the feedthrough into the turbine engine, and a mounting system for locating and fixing the feedthrough on the turbine case. The turbine can be rotated (one or multiple shafts of the engine of the engine can be rotated) as the spray is delivered by the spray nozzle device to the rotating components that are being sprayed with restoration coating. The spray typically possesses particles of size of less than five microns (e.g., the largest outside dimension of any, all, or each of the particles along a linear direction is no greater than five microns). As a result of the coating restoration, the time between overhauls of the turbine engine can be extended.

One or more novel features of the spray nozzle system include the use of an internal atomizing zone within the spray nozzle device and the use of a plenum post atomizing in the spray nozzle device. The plenum is an internal, elongated chamber in the spray device. The plenum is elongated (e.g., is longer) in a direction that is along or parallel to an axial direction or axis of the spray device (e.g., the direction in which the spray device is longest). The plenum can provide a supply of two-phase ceramic-liquid droplets in a carrier gas to the exit nozzles from the plenum. The elongated plenum allows for delivery of droplets from the array of exit orifices that provides a spray with a broad footprint. The broad spray allows uniform coverage of a coating on a component.

The spraying access tool and the spray nozzle device for providing a coating restoration system and process can include multiple elements, such as a device to allow access to the turbine engine, and a system for controlled rotation of the turbine engine at less than a slow designated speed, such as no faster than one hundred revolutions per minute. This can provide a system for full circumferential coating of the components that are being restored. The spray nozzle device can atomize a two-phase mixture of ceramic-liquid droplets in a carrier gas and coat the thermal barrier coating on the component using this mixture that is atomized within the spray nozzle device. A control system and a process can deliver two-phase mixture of ceramic-liquid droplets in a carrier gas to the atomizing nozzles within the spray nozzle device. The system can control droplet and gas delivery pressure, flow rate, delivery duration, and delivery time within a full spray coating program. The system can allow for a whole spectrum of options in terms of coating generation.

A spray and coating process can include selecting a nozzle spray angle, spray width, spray rates, spray duration, the number of passes over the targeted component surface, and/or the suitability of a component for coating based on the condition of the coating being restored. An engine start-up procedure can be used to cure the restoration coating. For example, the engine having the restored coating can be turned on, which generates heat that cures or speeds curing of the restored coating. Alternatively, a heating source can be introduced into the engine to affect local curing of the restoration coating. The curing device could also be employed with an element of engine rotation. For example, the engine can be rotated to speed up curing of the restored coating.

The spraying access tool and spray nozzle device have no moving components outside or inside the turbine engine during spraying of the restorative coating in one embodiment. Previous approaches use a spray nozzle that is moved over the surface on which coating deposition is being performed. The nozzle device employs no moving components inside the engine in one embodiment. This avoids parts being dropped or lost inside the engine during a coating procedure, and can provide for a more uniform coating.

The spray nozzle device can be configured to spray a full rotating blade set over the full three hundred sixty degrees of rotation of the blade around the shaft of the turbine engine with little to no blind spots or uncoated regions.

A control system can be used to supply two-phase mixture of ceramic-liquid droplets in a carrier gas to the feedthrough and nozzle system to provide the restoration coating around the full annular area of the turbine engine. The two-phase mixture of ceramic-liquid droplets in a carrier gas can be delivered to the nozzle system using individual tubes, coaxial tubes, or the like.

Different turbine architectures may require different nozzle devices and spray system designs. The feed through into the turbine engines for the nozzle device and spray system can be produced in a variety of manners, including three-dimensional or additive printing, which is rapid, relatively low cost, and well suited for this technology.

FIG. 1 illustrates one embodiment of a spray access tool 100. The spray access tool 100 can be included in a spraying system described herein. The spray access tool 100 is elongated from an insertion end 102 to an opposite distal end 104 along a center axis 106. The insertion end 102 is inserted into one or more openings into machinery in which the coating is to be applied (e.g., into the outer casing or housing of a turbine engine). The insertion end 102 includes an outer housing or casing 108 that extends around and at least partially encloses an atomizing spray nozzle device 110. The nozzle device 110 sprays an atomized, two-phase mixture of ceramic-liquid droplets in a carrier gas onto the interior surfaces of the machinery. The distal end 104 of the access tool 100 is fluidly coupled with one or more conduits of the spraying system for receiving the multiple, different phase materials that are atomized and mixed within the spray nozzle device 110.

In one embodiment, the atomizing spray nozzle device 110 applies the restoration coating using two fluid streams, a two-phase mixture of ceramic-liquid droplets in a carrier gas of ceramic particles in a first fluid (such as alcohol or water) and a second fluid (e.g., a gas such as air, nitrogen, argon, etc.) to produce two-phase droplets of the ceramic particles within the fluid. The ceramic particles produce the restorative coating when the ceramic particles impact the component. The two-phase droplets are directed toward the region of the component that requires restoration after field exposure. The fluid temperature and component substrate are selected to affect evaporation of the fluid during the flight from the atomizing spray nozzle device 110 to the substrate or component surface such that the deposit consists largely of only ceramic particles, and minimal or little fluid and gas. While prior spraying solutions use a spray nozzle that is moved over the surface on which deposition is being performed, the access tool 100 and spray nozzle device 110 are not moved (e.g., relative to the outer casing or housing of the turbine engine) during spraying. In one embodiment, the spray nozzle device 110 can apply the restorative coating without cleaning the thermal barrier coating before application of the restorative coating.

Figure 2:
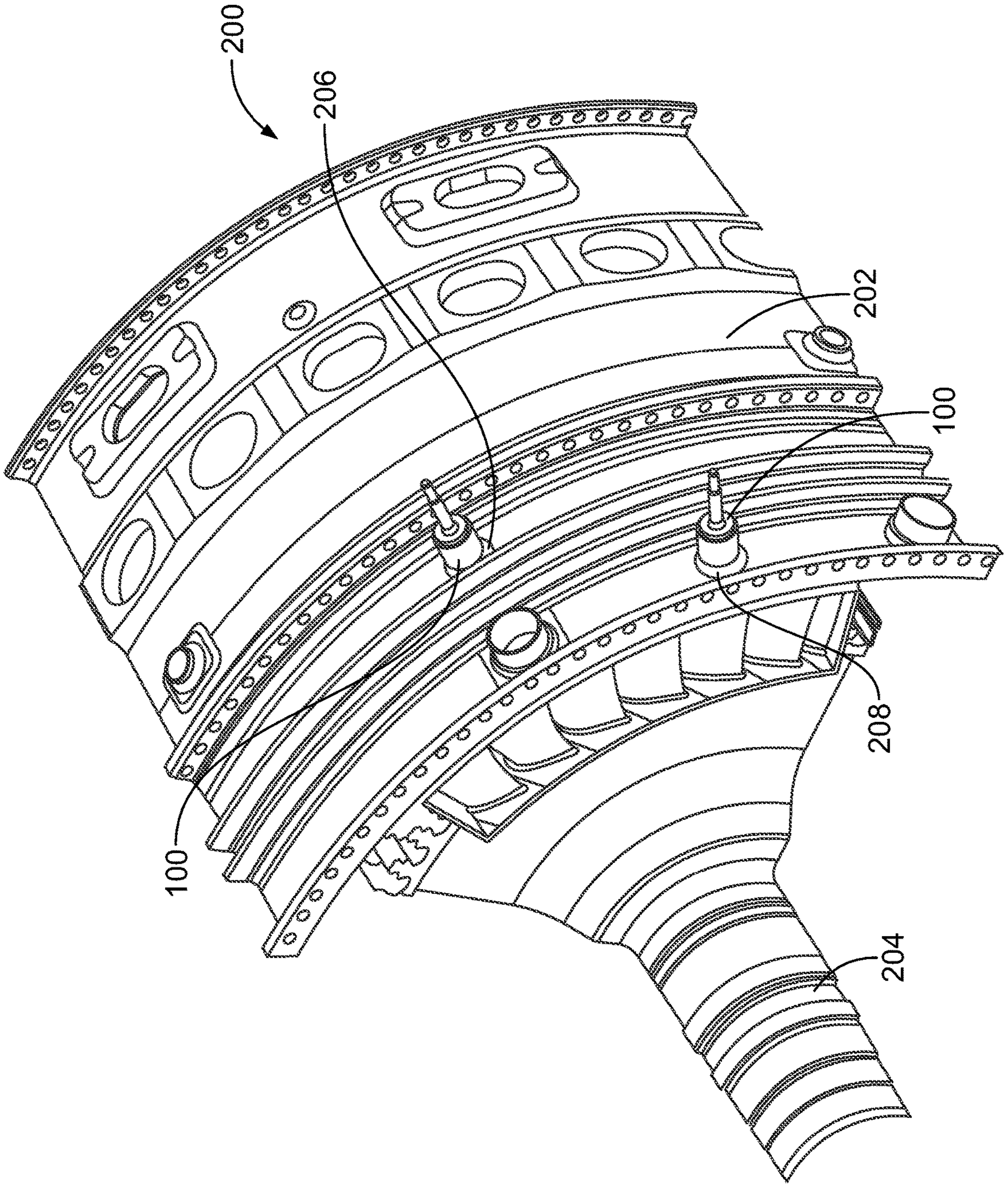
FIG. 2 illustrates a cut-away view of one embodiment of a machine in which the access tool shown in FIG. 1 is inserted to spray the coating on interior components of the machine.
Figure 3:
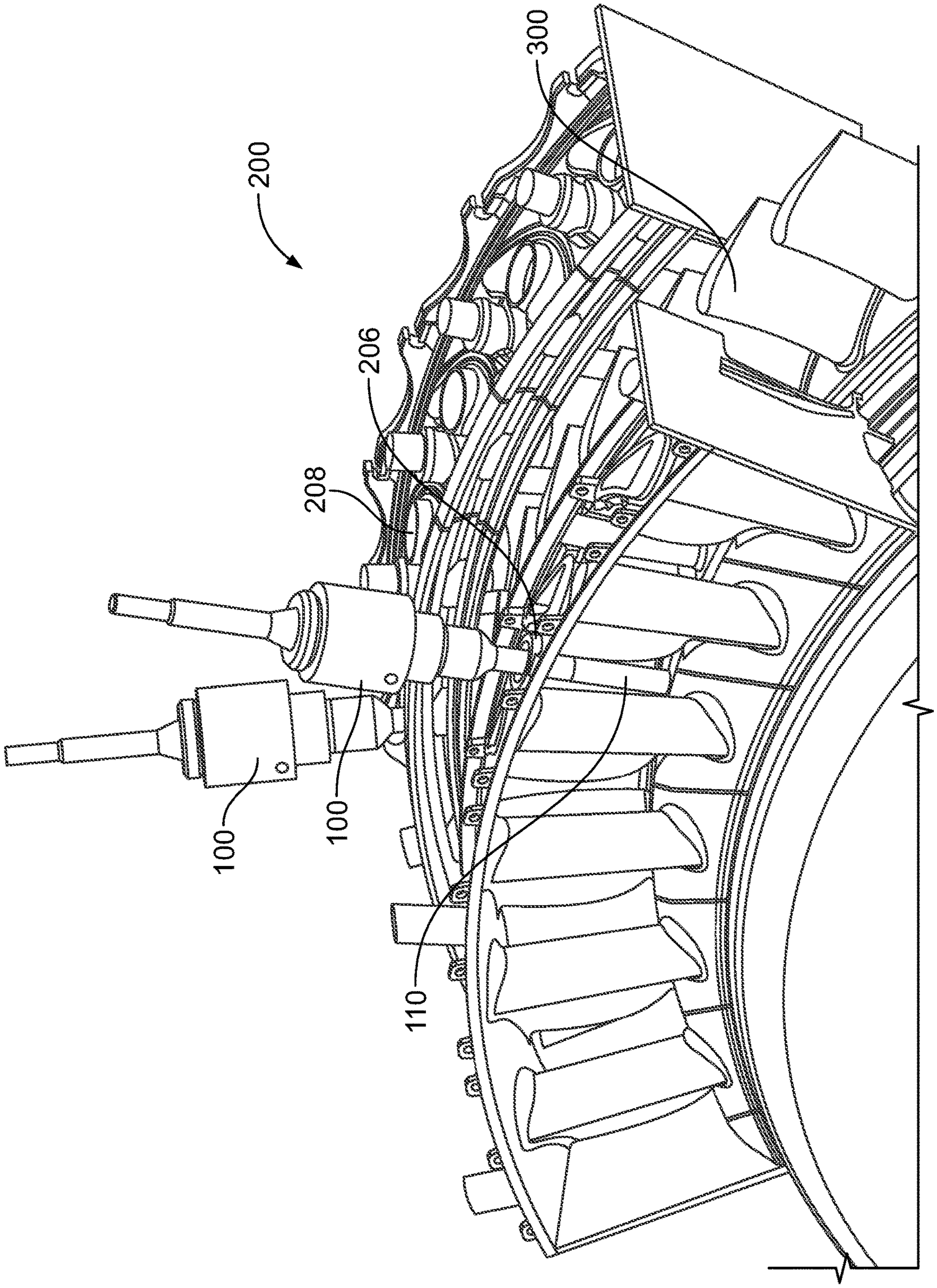
FIG. 3 illustrates a cross-sectional view of the machine shown in FIG. 2.
Figure 4:
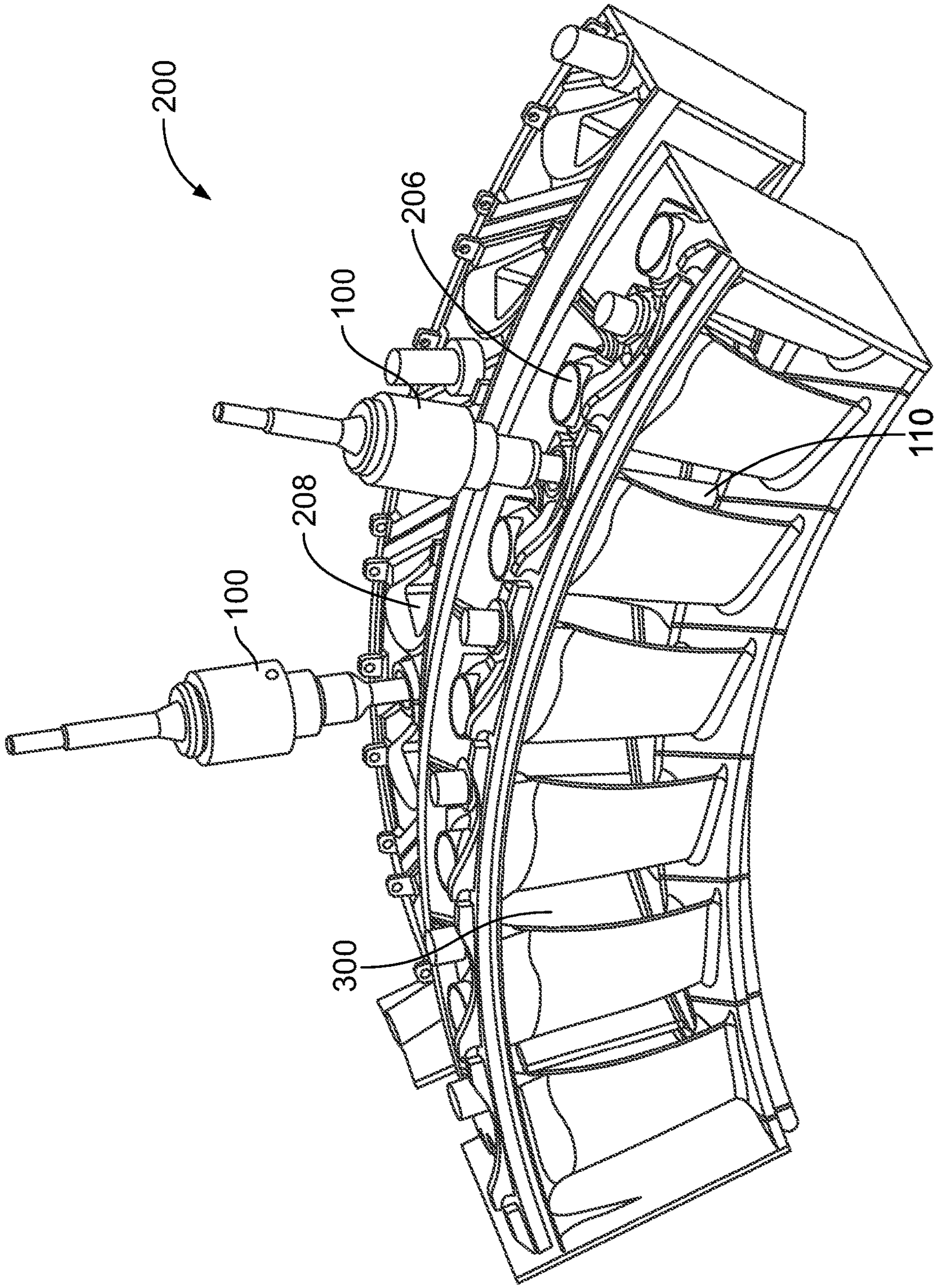
FIG. 4 illustrates another cross-sectional view of the machine shown in FIG. 2.

FIG. 2 illustrates a cut-away view of one embodiment of a machine 200 in which the access tool 100 is inserted to spray the coating on interior components of the machine 200. FIG. 3 illustrates a cross-sectional view of the machine 200 shown in FIG. 2. FIG. 4 illustrates another cross-sectional view of the machine 200 shown in FIG. 2. The machine 200 represents a turbine engine in the illustrated example, but optionally can be another type of machine or equipment. The machine 200 includes an outer housing or casing 202 that circumferentially extends around and encloses a rotatable shaft 204 having several turbine blades or fans 300 (shown in FIGS. 3 and 4) coupled thereto. The outer casing 202 includes several openings or ports 206, 208 that extend through the outer casing 202 and provide access into the interior of the outer casing 202. These ports 206, 208 can include stage one nozzle ports 206 and stage two nozzle ports 208 in the illustrated example, but optionally can include other openings or ports.

The access tool 100 is shaped to fit inside one or more of the ports 206, 208 such that the insertion end 102 of the access tool 100 (and the spray nozzle device 110) are disposed inside the machine 200, as shown in FIGS. 2 through 4. The opposite distal end 104 of the access tool 100 is located outside of the outer casing or housing 108 of the machine 200. During spraying of the restorative coating, the two-phase mixture of ceramic-liquid droplets in a carrier gas used to form the coating is fed to the access tool 100 through the distal end 104 and flow into the spray nozzle device 110. The spray nozzle device 110 atomizes and mixes these materials into an airborne two-phase mixture of ceramic-liquid droplets in a carrier gas that is sprayed onto components of the machine 200, such as the turbine blades 300. In one embodiment, the blades 300 can slowly rotate by the stationary spray nozzle device 110 during spraying of the restorative coating onto the blades 300. Alternatively, the restorative coating is sprayed onto the blades 300 or other surfaces inside the outer casing 202 of the machine 200 while the blades 300 or other surfaces remain stationary relative to the spray nozzle device 110.

The restorative coating on a thermal barrier coating can be applied to both surfaces of the turbine blade 300. The pressure side of the blade 300 can be coated using the spray access tool 100 and spray nozzle device 110 that is inserted into the stage one nozzle borescope port 206. The opposite suction side of the blade 300 can be coated using the same or another spraying access tool 100 and the same or another spray nozzle device 110 that is inserted through the stage two nozzle borescope port 208.

Figure 5:
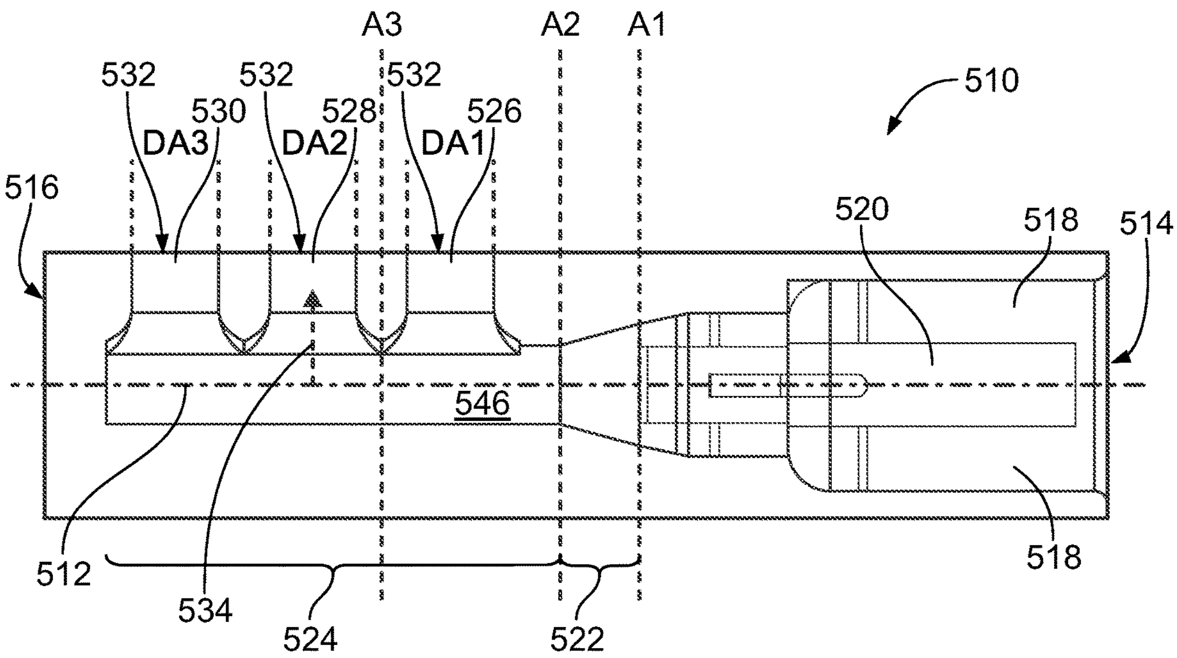
FIG. 5 illustrates a perspective view of one embodiment of an atomizing spray nozzle device.
Figure 6:
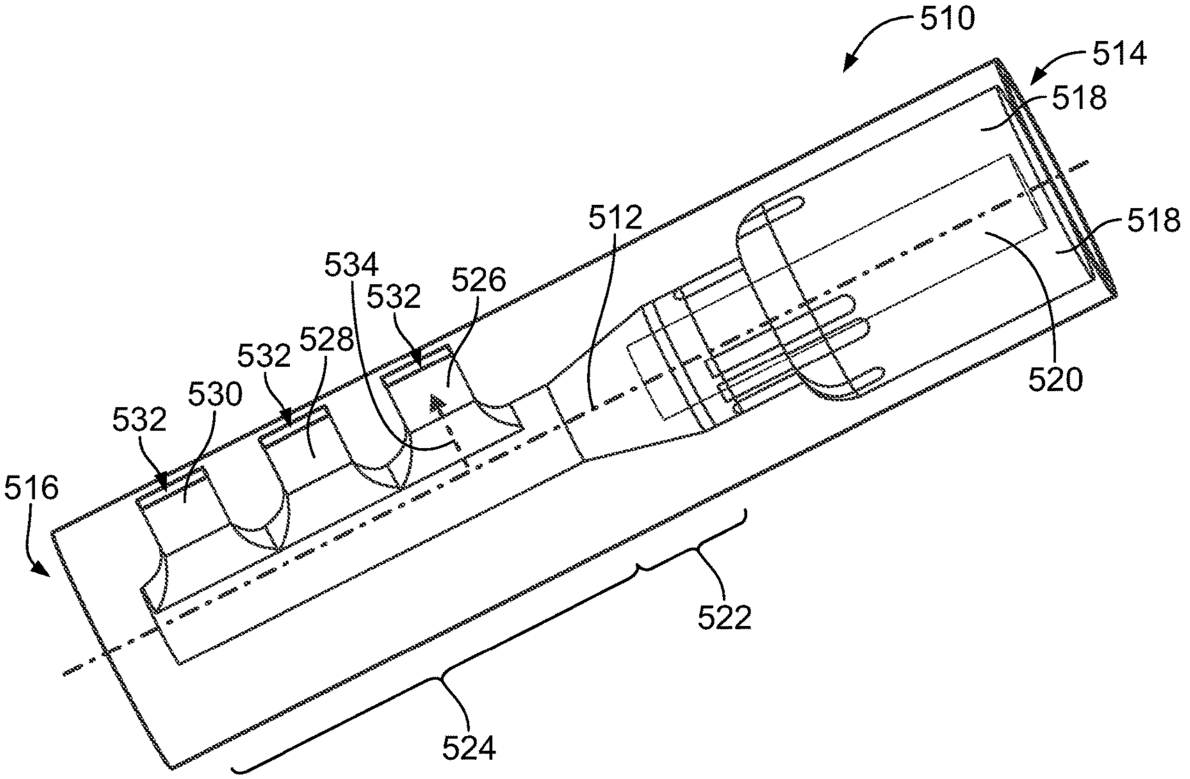
FIG. 6 illustrates a side view of the atomizing spray nozzle device shown in FIG. 5.

FIG. 5 illustrates a perspective view of one embodiment of an atomizing spray nozzle device 510. FIG. 6 illustrates a side view of the atomizing spray nozzle device 510 shown in FIG. 5. The spray nozzle device 510 can represent or be used in place of the spray nozzle device 110 shown in FIGS. 1 through 4. The spray nozzle device 510 is elongated along a center axis 512 from a feed end 514 to an opposite delivery end 516. The spray nozzle device 510 is formed from one or more housings that form an interior plenum chamber 546 extending between the feed end 514 and the delivery end 516. The interior plenum chamber 546 directs the flow of the materials forming the two-phase mixture of ceramic-liquid droplets in a carrier gas through and out of the spray nozzle device 510. As shown in FIG. 5, the plenum 546 is elongated in or along the center axis 512 (also referred to as an axial direction of the device 510). In the illustrated embodiment, the inlets 518, 520 are not directly coupled with the nozzles 526, 528, 530, but are coupled with the plenum 546, which is connected with the nozzles 526, 528, 530.

The housings of the spray nozzle device 510 and the other spray nozzle devices shown and described herein may have a cylindrical outer shape that is closed at one end (e.g., the delivery end) and that has inlets (as described below) at the opposite end (e.g., the feed end 514), with one or more internal chambers of different shapes formed inside the housing.

The spray nozzle device 510 includes several inlets 518, 520 extending from the feed end 514 toward (but not extending all the way to) the delivery end 516. These inlets 518, 520 receive different phases of the materials that are atomized within the spray nozzle device 510 to form the airborne two-phase mixture of ceramic-liquid droplets in a carrier gas that is sprayed onto the surfaces of the machine 200. In the illustrated embodiment, one inlet 518 extends around, encircles, or circumferentially surrounds the other inlet 520. The inlet 518 can be referred to as the outer inlet and the inlet 520 can be referred to as the inner inlet. Alternatively, the inlets 518, 520 may be disposed side-by-side or in another spatial relationship. While only two inlets 518, 520 are shown, more than two inlets can be provided.

The inlets 518, 520 may each be separately fluidly coupled with different conduits of a spraying system that supplies the different phases of materials to the spray nozzle device 510. These conduits can extend through or be coupled with separate conduits in the access tool 100 that are separately coupled with the different inlets 518, 520. This keeps the different phase materials separate from each other until the materials are combined and atomized inside the spray nozzle device 510.

The spray nozzle device 510 includes an atomizing zone housing 522 that is fluidly coupled with the inlets 518, 520. The atomizing zone housing 522 includes an outer housing that extends from the inlets 518, 520 toward, but not all the way to, the delivery end 516 of the spray nozzle device 510. The atomizing zone housing 522 defines an interior chamber in the spray nozzle device 510 into which the different phase materials in the inlets 518, 520 are delivered from the inlets 518, 520. For example, the two-phase mixture of ceramic-liquid droplets in a carrier gas formed from liquid and ceramic particles can be fed into the atomizing zone housing 522 from the inner inlet 520 and a gas (e.g., air) can be fed into the atomizing zone housing 522 from the outer inlet 518.

The ceramic particles are atomized during mixing with the gas in the atomizing zone housing 522 to form a two-phase mixture of ceramic-liquid droplets in a carrier gas. This two-phase mixture of ceramic-liquid droplets in a carrier gas flows out of the atomizing zone housing 522 into a plenum housing portion 524 of the spray nozzle device 510.

The housing portions for the various embodiments described herein can be different segments of a single-body housing, or can be separate housing pieces that are joined together.

The plenum housing portion 524 is another part of the housing of the spray nozzle device 510 that is fluidly coupled with the atomizing zone housing 522. The plenum housing portion 524 extends from the atomizing zone housing 522 to the delivery end 516 of the spray nozzle device 510, and includes the plenum 546. The plenum housing portion 524 receives the two-phase mixture of ceramic-liquid droplets in a carrier gas from the atomizing zone housing 522.

The annular inlet 518 delivers gas to the atomizing zone housing 522. The two-phase fluid of ceramic particles and liquid is delivered through the central inlet or tube 520 to the atomizing zone housing 522. Two-phase droplets of ceramic particles and liquid are generated in the atomizing zone housing 522 and the atomizing gas accelerates the two-phase droplets from the atomizing zone housing 522 to the manifold or plenum housing portion 524. In one embodiment, atomizing is complete before the droplets enter the plenum housing portion 524.

One or more delivery nozzles are fluidly coupled with the plenum housing portion 524. In the illustrated embodiment, the spray nozzle device 510 includes three nozzles 526, 528, 530, although a single nozzle or a different number of two or more nozzles may be provided instead. The delivery nozzle 526 can be referred to as an upstream delivery nozzle as the delivery nozzle 526 is upstream of the nozzles 528, 530 along a flow direction of the materials in the spray nozzle device 510 (e.g., the direction in which these materials flow along the center axis 512 of the spray nozzle device 510). The delivery nozzle 530 can be referred to as a downstream delivery nozzle as the delivery nozzle 530 is downstream of the delivery nozzles 526, 528 along the flow direction. The delivery nozzle 528 can be referred to as an intermediate delivery nozzle as the delivery nozzle 528 is between the delivery nozzles 526, 530 along the flow direction.

In the illustrated embodiment, the delivery nozzles 526, 528, 530 are formed as tapered rectangular channels that extend away from the outer surface of the spray delivery nozzle 510 in radial directions away from the center axis 512. The delivery nozzles 526, 528, 530 include rectangular openings 532 that are all elongated along the same direction that also is parallel to and extends along the center axis 512. Optionally, the delivery nozzles 526, 528, 530 may have other shapes, may have different sized openings, and/or may not be aligned with each other as shown in FIGS. 5 and 6.

The openings 532 of the nozzles 526, 528, 530 provide outlets through which the two-phase mixture of ceramic-liquid droplets in a carrier gas is delivered from the plenum housing portion 524 onto one or more surfaces of the target object of the machine 200 as a coating or restorative coating on the machine 200. The nozzles 526, 528, 530 can deliver the two-phase mixture of ceramic-liquid droplets in a carrier gas at pressures of ten to three hundred pounds per square inch and, in one embodiment, as a pressure of less than one hundred pounds per square inch for both the two-phase mixture delivery and the gas delivery.

As shown in FIGS. 5 and 6, the openings 532 in the nozzles 526, 528, 530 are oriented or positioned to direct the spray of the two-phase mixture of ceramic-liquid droplets in a carrier gas in radial directions 534 that radially extend away from the center axis 512 of the spray nozzle device 510 and/or in directions that are more aligned with the radial directions 534 than directions that are perpendicular to the radial directions 534 (e.g., these other directions are closer to being parallel than perpendicular to the radial directions 534).

In one embodiment, the nozzles 526, 528, 530 are small such that the nozzles 526, 528, 530 further atomize the two-phase mixture of ceramic-liquid droplets in a carrier gas. The gas moving through the delivery spray device 510 can carry the two-phase mixture of ceramic-liquid droplets in a carrier gas out of the nozzles 526, 528, 530 toward the surfaces onto which the restorative coating is being formed by the two-phase mixture of ceramic-liquid droplets in a carrier gas.

The spray nozzle device 510 is designed to provide a conduit for at least two fluid media. The first fluid is a two-phase mixture of ceramic particles in a liquid, such as yttria stabilized zirconia particles in alcohol. The particles are typically less than ten microns in size, and can be as small as less than 0.5 microns in size. The second fluid is an atomizing gas that generates a spray by disintegrating the two-phase mixture of ceramic particles in a liquid into two-phase droplets of the same liquid (such as alcohol) and ceramic particles. The conduit of the nozzle spray device 510 is designed such that little to no evaporation of the fluid occurs during the transfer such that the composition of the two-phase ceramic particle-liquid medium is preserved to the region of atomizing in the nozzles 526, 528, 530 and the generation of the two-phase droplets of the ceramic mixture, such as alcohol and yttria stabilized zirconia particles. The droplets are created within the spray nozzle device 510 prior to delivery of the materials onto the part being coated. The openings 532 of the delivery nozzles 526, 528, 530 operate to direct the spray and control the spray angle and width, and thereby provide a uniform coating.

Several cross-sectional planes through the spray nozzle device 510 are labeled in FIG. 5. The delivery nozzle device 510 has a tapered shape that decreases in cross-sectional area in the atomizing zone housing 522 from a larger cross-sectional area at the interface between the atomizing zone housing 522 (e.g., the cross-sectional plane labeled A1 in FIG. 5) to a smaller cross-sectional area at the interface between the atomizing zone housing 522 and the plenum housing portion 524 (e.g., the cross-sectional plane labeled A2 in FIG. 5). The cross-sectional area of the spray nozzle device 510 remains the same from the cross-sectional plane A2 to any cross-sectional plane located between or downstream of any of the delivery nozzles 526, 528, 530 (e.g., one of these cross-sectional planes is labeled A3 in FIG. 5).

The delivery nozzles 526, 528, 530 may have the same cross-sectional areas DA1, DA2, DA3 in any plane that is parallel to the center axis 512 of the spray nozzle device 510. The cross-section areas DA1, DA2, DA3 of the nozzles 52, 528, 530 operates as the metering orifice area in the fluid circuit of the spray nozzle device 510. In one embodiment, the sum of the cross-section areas DA1, DA2, DA3 of the delivery nozzles 526, 528, 530 is less than, equal to, or approximately equal to (e.g., within 1%, within 3%, or within 5% of) the cross-sectional area A1 of the interface between the outer inlet 518 and the atomizing zone housing 522 (also referred to as the throat area of the delivery nozzle device 510). The inventors of the subject matter described herein have discovered that these relationships between the cross-sectional areas result in metering of the two-phase mixture of ceramic-liquid droplets in a carrier gas through and out of the spray nozzle device 510 that applies the uniform coatings described herein.

The sizes and arrangements of the nozzles 526, 528, 530 provide a uniform thickness coating on the interior components of the machine 200 over a broader or wider area when compared with other known spray devices, without having any moving parts or components. For example, the two-phase mixture of ceramic-liquid droplets in a carrier gas that is sprayed from the nozzles 526, 528, 530 can extend over a wide range of degrees inside the machine 200 while providing a restorative coating that does not vary by more than 1%, more than 3%, or more than 5% in thickness. As described above, the spray nozzle device 510 may not have moving components and may not move relative to the outer casing 202 of the machine 200 during spraying of the coating, but the blades 300 of the machine 200 may slowly rotate during spraying so that multiple blades 300 can be covered by the restorative coating sprayed by the spray nozzle device 510.

Figure 23:
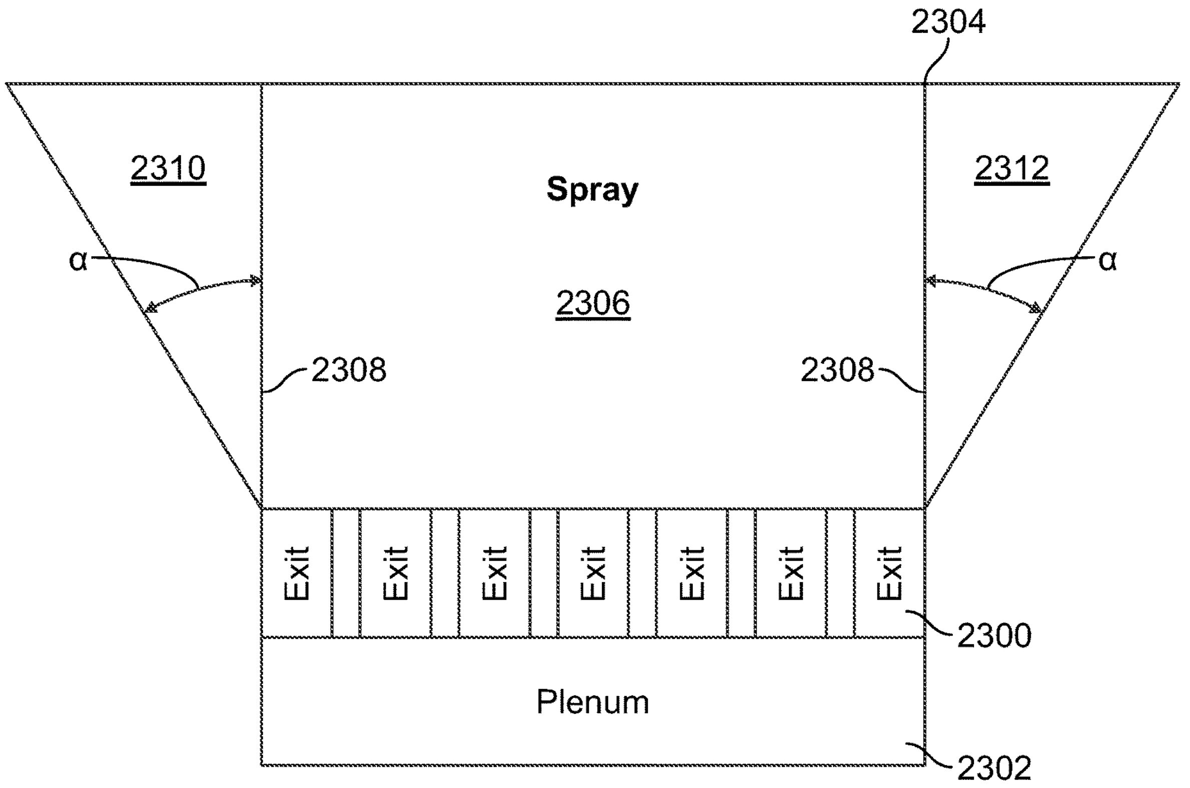
FIG. 23 schematically illustrates spraying of the coating by several nozzles of a spray device according to one example.

FIG. 23 schematically illustrates spraying of the coating by several nozzles 2300 of a spray device according to one example. The nozzles 2300 can represent one or more of the nozzles described herein. The nozzles 2300 are fluidly coupled with a plenum chamber 2302, which can represent one or more of the plenum chambers described herein. The nozzles 2300 and plenum chamber 2302 can represent the nozzles and/or plenum chambers in one or more of the spray devices described herein.

The nozzles 2300 direct the coating being sprayed over a very large area. In one embodiment, the nozzles 2300 spray the coating over an area 2304 that includes a rectangular sub-area 2306 that is bounded by linear paths 2308 extending away from the outermost edges of the outermost nozzles 2300 in radial directions from the center axis. The area 2304 also extends beyond the sub-area 2306 into two angled areas 2310, 2312. The angled areas 2310, 2312 extend outward from the sub-area 2306 by angles α. The angles α can vary in size but, in at least one embodiment, the angles α are each at least fifteen degrees and no more than 35 degrees. The entire area 2304 defines a large area over which the spray device can apply a uniform coating without having to move the spray device.

Figure 7:
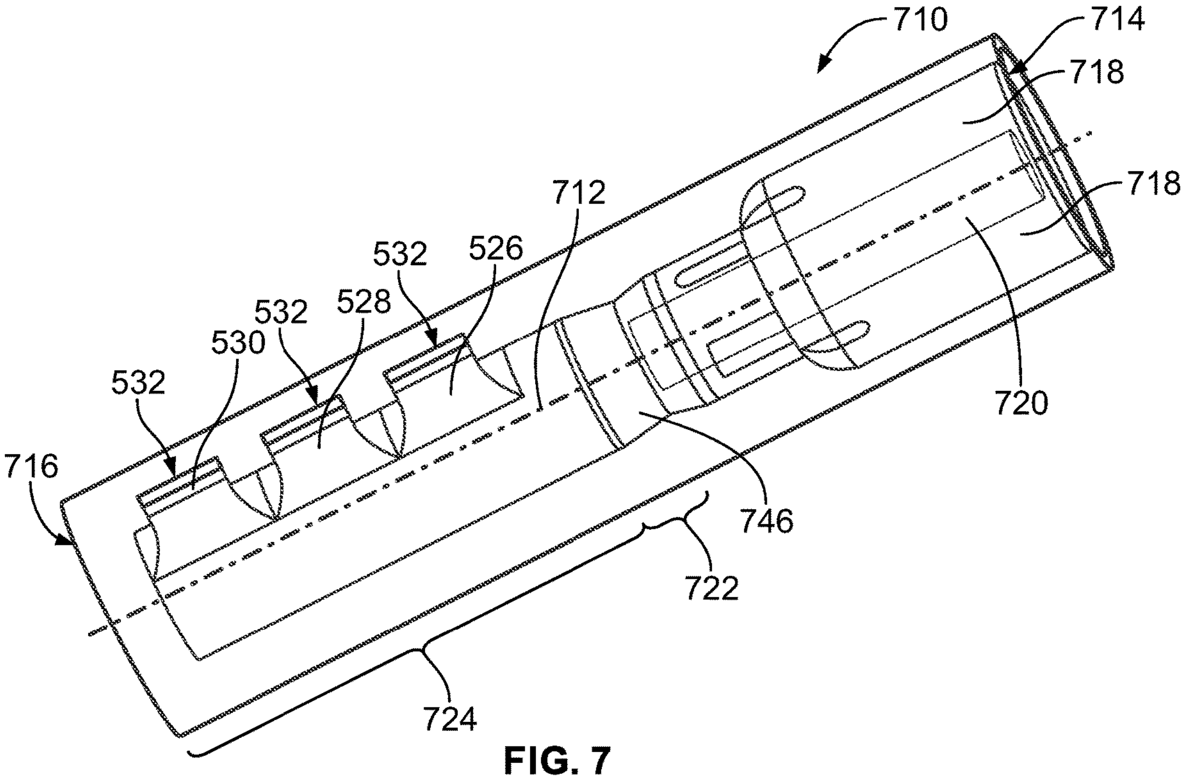
FIG. 7 illustrates a perspective view of one embodiment of an atomizing spray nozzle device.
Figure 8:
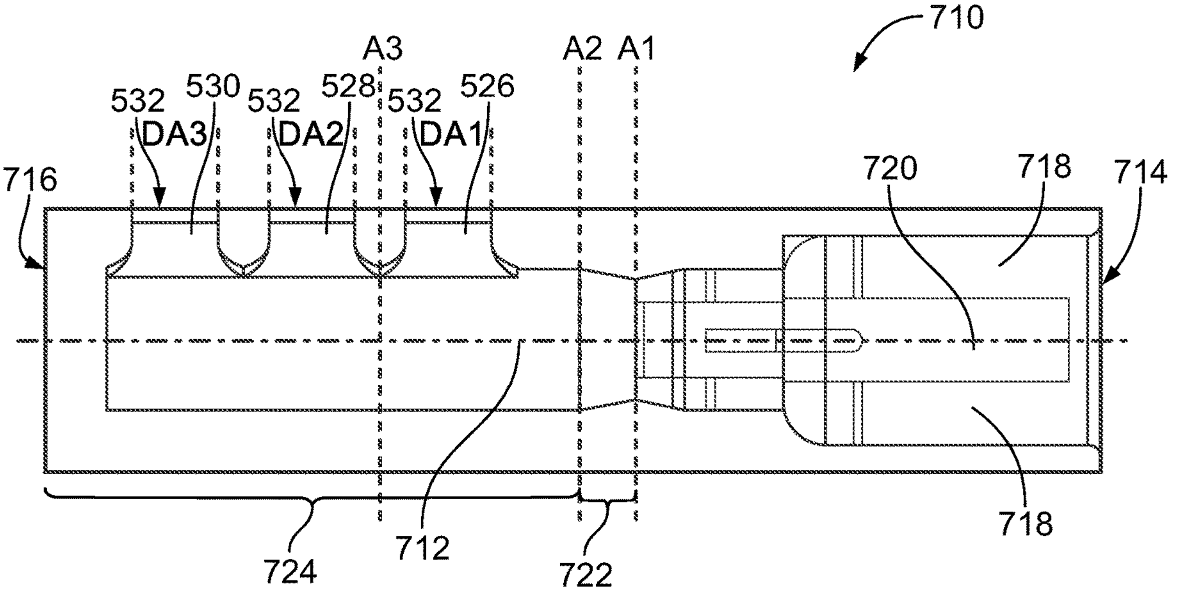
FIG. 8 illustrates a side view of the atomizing spray nozzle device shown in FIG. 7.

FIG. 7 illustrates a perspective view of one embodiment of an atomizing spray nozzle device 710. FIG. 8 illustrates a side view of the atomizing spray nozzle device 710 shown in FIG. 7. The spray nozzle device 710 can represent or be used in place of the spray nozzle device 110 shown in FIGS. 1 through 4. The spray nozzle device 710 is elongated along a center axis 712 from a feed end 714 to an opposite delivery end 716, and includes an interior plenum or chamber 746 through which materials flow in the device 710. The spray nozzle device 710 includes several inlets 718, 720 extending from the feed end 714 toward (but not extending all the way to) the delivery end 716. These inlets 718, 720 receive different phases of the materials that are atomized within the spray nozzle device 710 to form the airborne mixture that is sprayed onto the surfaces of the machine 200. In the illustrated embodiment, the inlet 718 is annular shaped and extends around, encircles, or circumferentially surrounds the other inlet 720, similar to the inlets 518, 520 described above. Alternatively, the inlets 718, 720 may be disposed side-by-side or in another spatial relationship. While only two inlets 718, 720 are shown, more than two inlets can be provided.

The inlets 718, 720 may each be separately fluidly coupled with different conduits of a spraying system that supplies the different phases of materials to the spray nozzle device 710, similar to the inlets 518, 520. The spray nozzle device 710 includes an atomizing zone housing 722 that is fluidly coupled with the inlets 718, 720. The atomizing zone housing 722 includes an outer housing that extends from the inlets 718, 720 toward, but not all the way to, the delivery end 716 of the spray nozzle device 710. The atomizing zone housing 722 defines an interior chamber in the spray nozzle device 710 into which the different phase materials in the inlets 718, 720 are delivered from the inlets 718, 720 and atomized, similar to as described above in connection with the atomizing zone housing 522 of the spray nozzle device 510.

A plenum housing portion 724 is another part of the housing of the spray nozzle device 710 that is fluidly coupled with the atomizing zone housing 722. The plenum housing portion 724 extends from the atomizing zone housing 722 to the delivery end 716 of the spray nozzle device 710, and includes the plenum 746. The plenum housing portion 724 receives the two-phase mixture of ceramic-liquid droplets in a carrier gas from the atomizing zone housing 722, similar to as described above in connection with the spray nozzle device 510. The plenum housing portion 724 is coupled with the delivery nozzles 526, 528, 530 that direct the two-phase mixture of ceramic-liquid droplets in a carrier gas and carrying gas toward the surfaces being coated, as described above. As shown in FIG. 7, the plenum 746 is elongated in or along the center axis 712. In the illustrated embodiment, the inlets 718, 720 are not directly coupled with the nozzles 726, 728, 730, but are coupled with the plenum 746, which is connected with the nozzles 726, 728, 730.

As shown in FIGS. 5 through 8, one manner in which the spray nozzle devices 510, 710 differ is the shape of the housings of the devices 510, 710 in the atomizing zone housings 522, 722. The interior chamber formed by the atomizing zone housing 522 in the device 510 is tapered along the flow direction in the device 510 such that the cross-sectional area of the atomizing zone housing 522 decreases at different locations along the center axis 512 in the feed direction (e.g., the housing 522 becomes narrower as the materials flow through the housing 522 toward the nozzles 526, 528, 530). Conversely, the interior chamber formed by the atomizing zone housing 722 in the device 710 is tapered in a direction that is opposite the flow direction in the device 710 such that the cross-sectional area of the atomizing zone housing 722 increases at different locations along the center axis 512 in the direction that is opposite to the feed direction (e.g., the housing 722 becomes wider or larger as the materials flow through the housing 722 toward the nozzles 526, 528, 530).

Several cross-sectional planes through the spray nozzle device 710 are labeled in FIG. 7. The delivery nozzle device 710 has a tapered shape that increases in cross-sectional area in the atomizing zone housing 722 from a smaller cross-sectional area at the interface between the atomizing zone housing 722 (e.g., the cross-sectional plane labeled A1 in FIG. 7) to a larger cross-sectional area at the interface between the atomizing zone housing 722 and the plenum housing portion 724 (e.g., the cross-sectional plane labeled A2 in FIG. 7). The cross-sectional area of the spray nozzle device 710 remains the same from the cross-sectional plane A2 to any cross-sectional plane located between or downstream of any of the delivery nozzles 526, 528, 530 (e.g., one of these cross-sectional planes is labeled A3 in FIG. 7).

The delivery nozzles 526, 528, 530 may have the same cross-sectional areas DA1, DA2, DA3 in any plane that is parallel to the center axis 712 of the spray nozzle device 710. The cross-section areas DA1, DA2, DA3 of the nozzles 52, 528, 530 operate as the metering orifice area in the fluid circuit of the spray nozzle device 710. In one embodiment, the sum of the cross-section areas DA1, DA2, DA3 of the delivery nozzles 526, 528, 530 is less than the cross-sectional area A1 of the interface between the outer inlet 718 and the atomizing zone housing 722 (also referred to as the throat area of the delivery nozzle device 710). The inventors of the subject matter described herein have discovered that these relationships between the cross-sectional areas result in metering of the two-phase mixture of ceramic-liquid droplets in a carrier gas through and out of the spray nozzle device 710 that applies the uniform coatings described herein.

Figure 9:
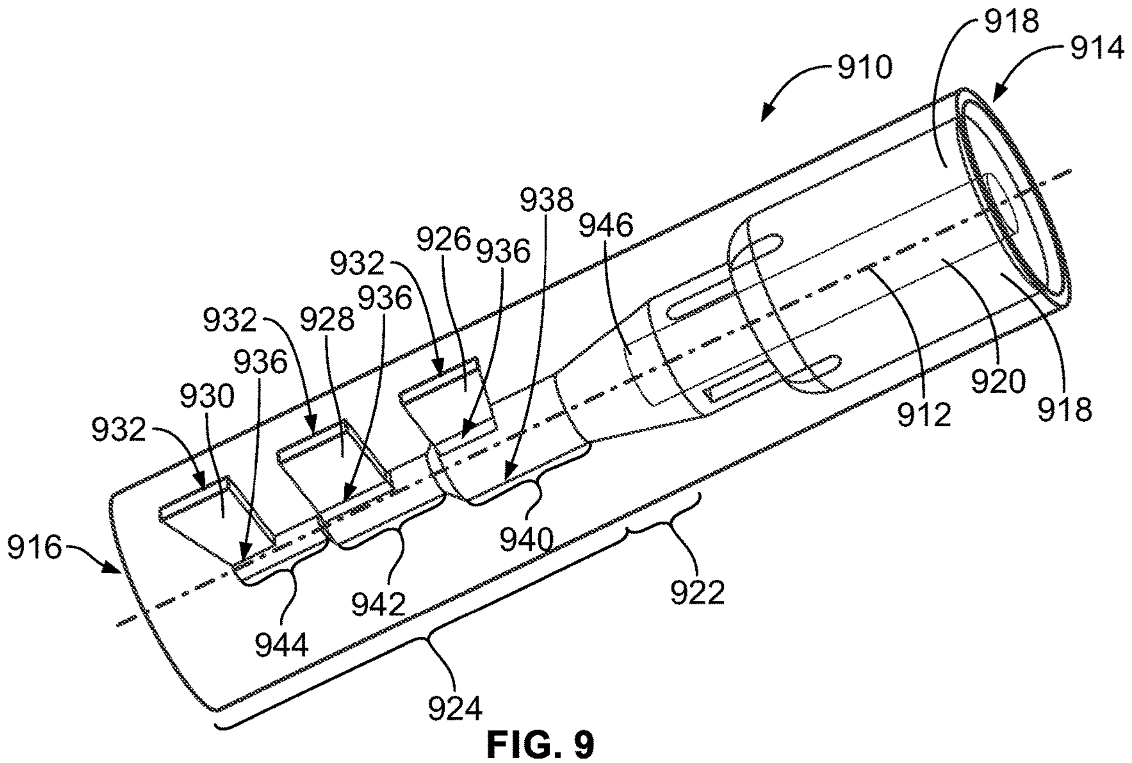
FIG. 9 illustrates a perspective view of one embodiment of an atomizing spray nozzle device.
Figure 10:
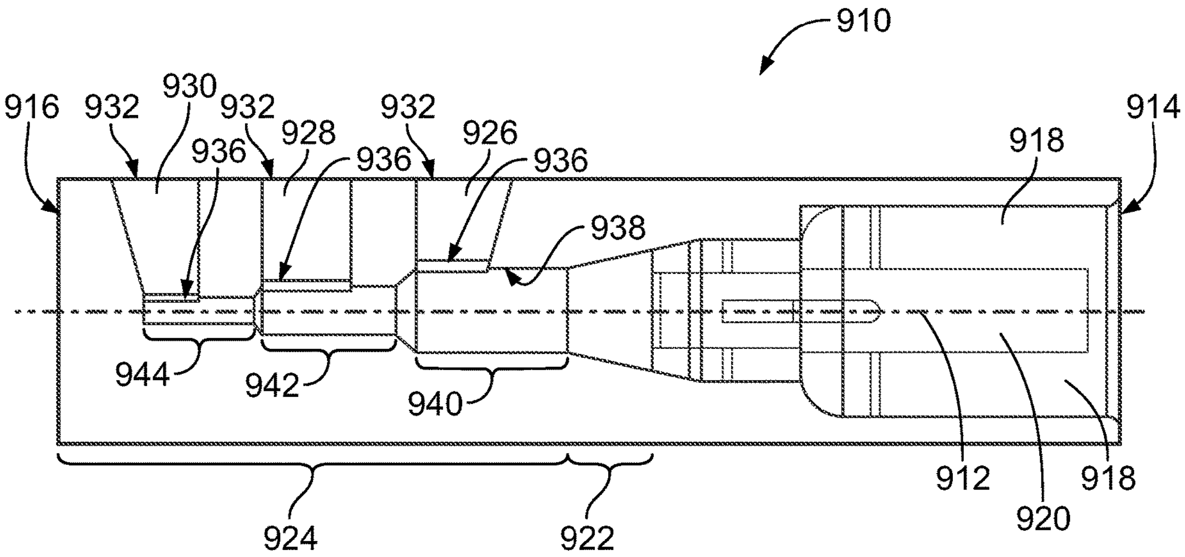
FIG. 10 illustrates a side view of the atomizing spray nozzle device shown in FIG. 9.
Figure 11:
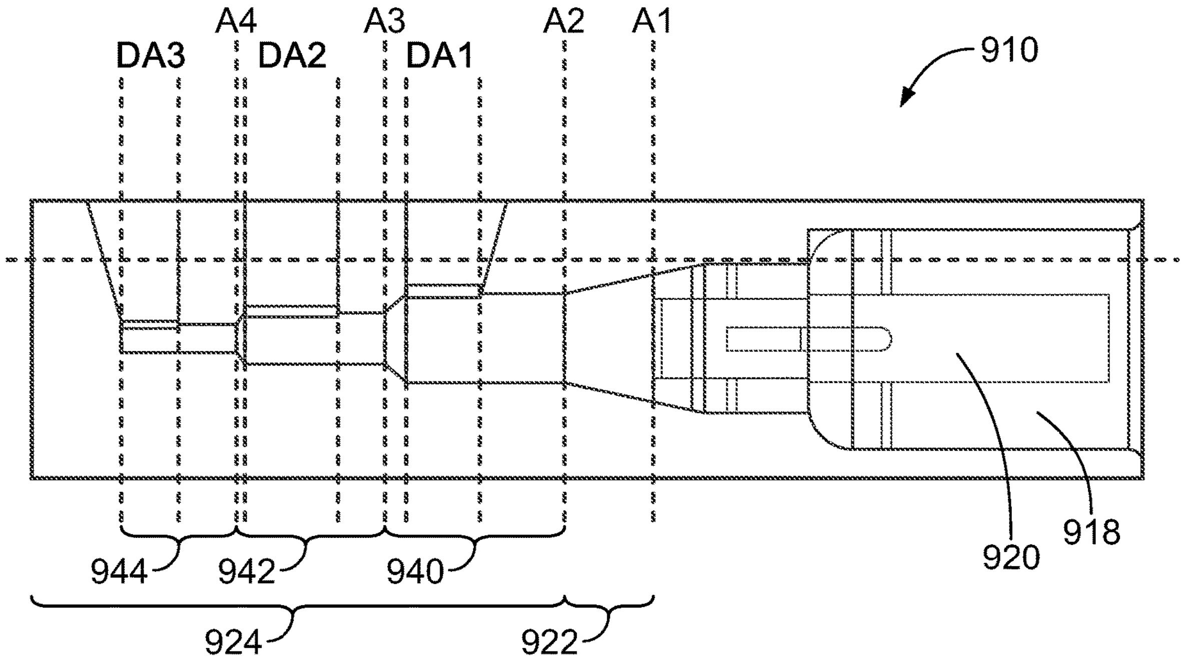
FIG. 11 illustrates another side view of the atomizing spray nozzle device shown in FIG. 9.

FIG. 9 illustrates a perspective view of one embodiment of an atomizing spray nozzle device 910. FIG. 10 illustrates a side view of the atomizing spray nozzle device 910 shown in FIG. 9. FIG. 11 illustrates another side view of the atomizing spray nozzle device 910 shown in FIG. 9 with several cross-sectional planes being labeled.

The spray nozzle device 910 can represent or be used in place of the spray nozzle device 110 shown in FIGS. 1 through 4. The spray nozzle device 910 is elongated along a center axis 912 from a feed end 914 to an opposite delivery end 916, and includes an interior chamber or plenum 946 through which materials flow in the device 910. The spray nozzle device 910 includes several inlets 918, 920 extending from the feed end 914 toward (but not extending all the way to) the delivery end 916. These inlets 918, 920 receive different phases of the materials that are atomized within the spray nozzle device 910 to form the airborne mixture that is sprayed onto the surfaces of the machine 200. In the illustrated embodiment, the inlet 918 is annular shaped and extends around, encircles, or circumferentially surrounds the other inlet 920, similar to the inlets 518, 520 described above. Alternatively, the inlets 918, 920 may be disposed side-by-side or in another spatial relationship. While only two inlets 918, 920 are shown, more than two inlets can be provided.

The inlets 918, 920 may each be separately fluidly coupled with different conduits of a spraying system that supplies the different phases of materials to the spray nozzle device 910, similar to the inlets 518, 520. The spray nozzle device 910 includes an atomizing zone housing 922 that is fluidly coupled with the inlets 918, 920. The atomizing zone housing 922 includes an outer housing that extends from the inlets 918, 920 toward, but not all the way to, the delivery end 916 of the spray nozzle device 910. The atomizing zone housing 922 defines an interior chamber in the spray nozzle device 910 into which the different phase materials in the inlets 918, 920 are delivered from the inlets 918, 920 and atomized, similar to as described above in connection with the atomizing zone housing 522 of the spray nozzle device 510.

A plenum housing portion 924 is another part of the housing of the spray nozzle device 910 that is fluidly coupled with the atomizing zone housing 922. The plenum housing portion 924 extends from the atomizing zone housing 922 to the delivery end 916 of the spray nozzle device 910, and includes the plenum 946. The plenum housing portion 924 receives the two-phase mixture of ceramic-liquid droplets in a carrier gas from the atomizing zone housing 922, similar to as described above in connection with the spray nozzle device 510. The plenum housing portion 924 is coupled with several delivery nozzles 926, 928, 930 that direct the two-phase mixture of ceramic-liquid droplets in a carrier gas and carrying gas toward the surfaces being coated, as described above. As shown in FIG. 9, the plenum 946 is elongated in or along the center axis 912. In the illustrated embodiment, the inlets 918, 920 are not directly coupled with the nozzles 926, 928, 930, but are coupled with the plenum 946, which is connected with the nozzles 926, 928, 930.

One way the spray nozzle device 910 differs from the spray nozzle devices 510, 710 is the shape of the nozzles 926, 928, 930 in the plenum housing portion 924. The nozzles 526, 528, 530 in the spray nozzle devices 510, 710 have non-tapered shapes in that the cross-sectional areas of the intersections between the nozzles 526, 528, 530 and the plenum housing portions 524, 724 in the spray nozzle devices 510, 710 are the same as the corresponding openings 532 of the nozzles 526, 528, 530. For example, the nozzles 526, 528, 530 may have the same size and/or shape on opposite ends of each nozzle 526, 528, 530. Conversely, one or more of the nozzles 926, 930 in the spray nozzle device 910 has a tapered shape in the illustrated embodiment. For example, the outer delivery nozzles 926, 930 (e.g., the upstream and downstream delivery nozzles 926, 930) are flared or otherwise tapered in or along radial directions 934 that radially extend away from the center axis 912. These nozzles 926, 930 may be flared or tapered in that the cross-sectional area of outer openings 932 at the outer ends of the nozzles 926, 930 are larger than internal openings 936 at intersections between the nozzles 926, 930 and the interior chamber defined by the plenum housing portion 924. The two-phase mixture of ceramic-liquid droplets in a carrier gas flows from the interior chamber defined by the plenum housing portion 924 into the delivery nozzles 926, 928, 930 through the internal openings 936. The two-phase mixture of ceramic-liquid droplets in a carrier gas flows out of the spray delivery device 910 through the outer openings 932, similar to how the two-phase mixture of ceramic-liquid droplets in a carrier gas flows out of the spray delivery devices 510, 710 through the openings 532.

Another difference between the spray nozzle device 910 and one or more other spray nozzle devices disclosed herein is the shape of the plenum housing portion 924. An inner surface 938 of the plenum housing portion 924 defines the interior chamber in the plenum housing portion 924 through which the two-phase mixture of ceramic-liquid droplets in a carrier gas flows to the delivery nozzles 926, 928, 930. In contrast to this inner surface in the plenum housing portions 524, 724 of the spray devices 510, 710, the inner surface 938 in the plenum housing portion 924 of the spray device 910 is staged in cross-sectional area such that different segments of the plenum housing portion 924 have different cross-sectional areas. These segments can include an upstream segment 940, an intermediate segment 942, and a downstream segment 944. Optionally, there can be fewer or a greater number of segments.

Different delivery nozzles 926, 928, 930 can be fluidly coupled with different segments 940, 942, 944 of the plenum housing portion 924. For example, the upstream delivery nozzle 926 can be fluidly coupled with the upstream segment 940, the intermediate delivery nozzle 928 can be fluidly coupled with the intermediate segment 942, and the downstream delivery nozzle 930 can be fluidly coupled with the downstream segment 944.

In the illustrated embodiment, the segments 940, 942, 944 of the plenum housing portion 924 are staged in cross-sectional area such that the cross-sectional areas of the segments 940, 942, 944 decrease at different locations along the length of the center axis 912 in the flow direction of the spray nozzle device 910. For example, the cross-sectional area of the upstream segment 940 can be larger than the cross-sectional area of the intermediate segment 942 and can be larger than the cross-sectional area of the downstream segment 944. The cross-sectional area of the intermediate segment 942 can be larger than the cross-sectional are of the downstream segment 944.

Several cross-sectional areas of the spray delivery device 910 are labeled in FIG. 11 to avoid confusion with the other labeled items and reference numbers shown in FIG. 10. The cross-sectional area at the interface between the atomizing zone housing 922 and the inlets 918, 920 (labeled A1 in FIG. 11) is larger than the cross-sectional area at the interface between the atomizing zone housing 922 and the plenum housing portion 924 (labeled A2 in FIG. 11) in one embodiment. For example, the size of the atomizing zone housing 922 may be tapered along the flow direction similar to the atomizing zone housing 522 of the spray device 510 shown in FIGS. 5 and 6. The interior surface 938 of the plenum housing portion 924 includes several steps that define the different segments 940, 942, 944. Additional cross-sectional areas at different locations along the flow direction within these steps in the spray device 910 continue to decrease. For example, a cross-sectional area in the location labeled A2 (at a leading end of the upstream segment 940) can be larger than the cross-sectional area in the location labeled A3 (at a leading end of the intermediate segment 942) and can be larger than the cross-sectional area in the location labeled A4 (at a leading end of the downstream segment 944). The cross-sectional area in the location labeled A3 can be larger than the cross-sectional area in the location labeled A4.

The cross-sectional areas of the interior chamber defined by the plenum housing portion 924 on either side of the delivery nozzles 926, 928, 930 and the cross-sectional areas of the outer openings 932 of the nozzles 926, 928, 930 can be related. For example, the cross-sectional area of the interior chamber at the location labeled A3 can be equal to or approximately equal to the difference between the cross-sectional area of the interior chamber at the location labeled A2 and the cross-sectional area of the outer opening 932 of the upstream nozzle 926. The cross-sectional area of the interior chamber at the location labeled A4 can be equal to or approximately equal to the difference between the cross-sectional area of the interior chamber at the location labeled A3 and the cross-sectional area of the outer opening 932 of the intermediate nozzle 926. The sum of the cross-sectional areas of the outer openings 932 of the delivery nozzles 926, 928, 930 is no larger than the cross-sectional area of the interior chamber at the location labeled A2 in one embodiment.

The stepped cross-sectional areas of the interior chamber defined by the plenum housing portion 924 provides for more uniform pressure and delivery of droplets of the two-phase mixture of ceramic-liquid droplets in a carrier gas along the spray delivery device 910 as the delivery nozzle exit area increases with increasing length along the spray delivery device 910. One advantage of this design is that the design provides improved distribution of the ceramic particle-liquid droplets from the delivery nozzles 926, 928, 930 along the length of the spray nozzle device 910, and improved uniformity of the coating on the components inside the machine 200 relative to one or more other embodiments disclosed herein.

Figure 12:
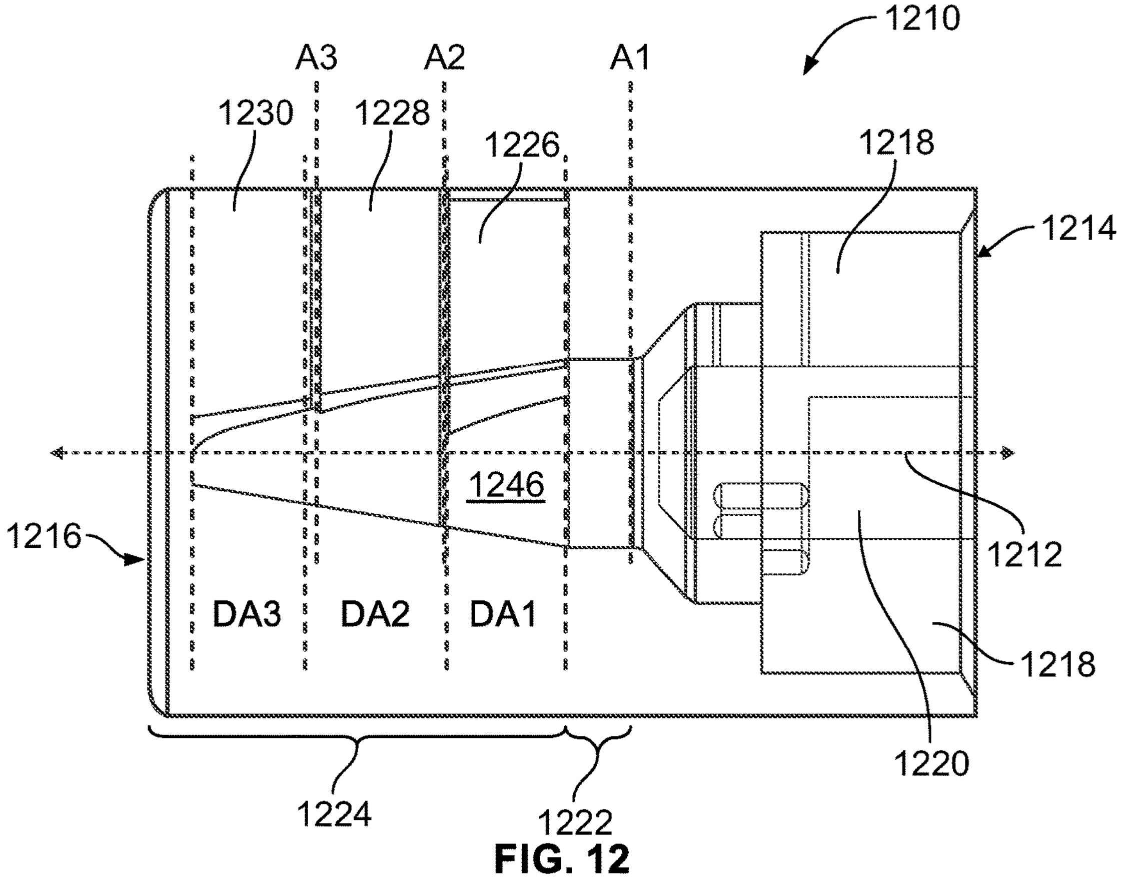
FIG. 12 illustrates a side view of one embodiment of an atomizing spray nozzle device.

FIG. 12 illustrates a side view of one embodiment of an atomizing spray nozzle device 1210. The spray nozzle device 1210 can represent or be used in place of the spray nozzle device 110 shown in FIGS. 1 through 4. The spray nozzle device 1210 is elongated along a center axis 1212 from a feed end 1214 to an opposite delivery end 1216, and includes an interior chamber or plenum 1246 through which materials flow in the device 1210. The spray nozzle device 1210 includes several inlets 1218, 1220 extending from the feed end 1214 toward (but not extending all the way to) the delivery end 1216. As described above, these inlets 1218, 1220 receive different phases of the materials that are atomized within the spray nozzle device 1210 to form the airborne mixture that is sprayed onto the surfaces of the machine 200. In the illustrated embodiment, the inlet 1218 is annular shaped and extends around, encircles, or circumferentially surrounds the other inlet 1220, similar to as described above. Alternatively, the inlets 1218, 1220 may be disposed side-by-side or in another spatial relationship. While only two inlets 1218, 1220 are shown, more than two inlets can be provided.

The spray nozzle device 1210 includes an atomizing zone housing 1222 that is fluidly coupled with the inlets 1218, 1220. The atomizing zone housing 1222 includes an outer housing that extends from the inlets 1218, 1220 toward, but not all the way to, the delivery end 1216 of the spray nozzle device 1210. The atomizing zone housing 1222 defines an interior chamber in the spray nozzle device 1210 into which the different phase materials in the inlets 1218, 1220 are delivered from the inlets 1218, 1220 and atomized, similar to as described above.

A plenum housing portion 1224 is another part of the housing of the spray nozzle device 1210 that is fluidly coupled with the atomizing zone housing 1222. The plenum housing portion 1224 extends from the atomizing zone housing 1222 to the delivery end 1216 of the spray nozzle device 1210, and includes the plenum 1246. The plenum housing portion 1224 receives the two-phase mixture of ceramic-liquid droplets in a carrier gas from the atomizing zone housing 1222, similar to as described above. The plenum housing portion 1224 is coupled with several separate delivery nozzles 1226, 1228, 1230 that direct the two-phase mixture of ceramic-liquid droplets in a carrier gas and carrying gas toward the surfaces being coated, as described above. Although not shown in FIG. 12, the nozzles 1226, 1228, 1230 can include the openings into the plenum housing portion 1224 (through which the multi-phase mixture is received from the interior chamber of the plenum housing portion 1224) and the openings from which the multi-phase mixture exits the spray nozzle device 1210. The plenum 1246 is elongated in or along the center axis 1212. In the illustrated embodiment, the inlets 1218, 1220 are not directly coupled with the nozzles 1226, 1228, 1230, but are coupled with the plenum 1246, which is connected with the nozzles 1226, 1228, 1230.

One way in which the spray nozzle device 1210 differs from one or more other embodiments of the spray nozzle devices is the tapered shape of the interior chamber 1246. As shown in FIG. 12, the interior chamber 1246 has a cross-sectional area that decreases at different locations in the flow direction within the device 1210. For example, the cross-sectional area of the interior chamber 1246 at a cross-sectional plane A1 (the interface between the inlets 1218, 1220 and the atomizing zone housing 1222) is larger than the cross-sectional area of the interior chamber 1246 a cross-sectional plane A2 at a location between the upstream and intermediate delivery nozzles 1226, 1228, and is larger than the cross-sectional area of the interior chamber 1246 at a cross-sectional plane A3 at a location that is between the intermediate and downstream delivery nozzles 1228, 1230. The cross-sectional area of the interior chamber 1246 at the plane A2 is larger than the cross-sectional area of the interior chamber 1246 at the plane A3.

Additionally, the spray nozzle device 1210 can differ from one or more other spray nozzle devices disclosed herein in that the delivery nozzles 1226, 1228, 1230 are disposed closer to each other. The delivery nozzles of one or more other spray nozzle devices disclosed herein may be spaced apart from each other in directions that are parallel to the center axes and/or flow directions of the spray nozzle devices. The delivery nozzles 1226, 1228, 1230 of the spray nozzle device 1210 can be closer to each other, as shown in FIG. 12. The nozzles 1226, 1228, 1230 may remain separate from each other in that a small portion of the housing forming the nozzles 1226, 1228, 1230 can extend between neighboring nozzles 1226, 1228, 1230 to keep the multi-phase mixture flowing in one nozzle 1226, 1228, or 1230 separate from the multi-phase mixture flowing in another nozzle 1226, 1228, and/or 1230.

The cross-sectional areas of the nozzle openings and the cross-sectional areas of the interior chamber 1246 can be related. For example, the cross-sectional area of the interior chamber 1246 at the plane A3 can be equal or approximately equal to the difference between the cross-sectional area of the interior chamber 1246 at the plane A2 and the cross-sectional area of the outer opening of the upstream nozzle 1226 (e.g., the opening through which the multi-phase mixture exits the device 1210 through the nozzle 1226). The progressive reduction in cross-sectional areas with increasing length of the interior chamber 1246 can provide for more uniform pressure and delivery of droplets of the multi-phase mixture along the length of the device 1210. This tapered manifold design can prevent the pressure of the multi-phase mixture from dropping across the length of the delivery nozzles 1226, 1228, 1230, and can result in a more uniform delivery of droplets of the multi-phase mixture over all the outer openings of the delivery nozzles 1226, 1228, 1230 when compared to one or more other embodiments described herein.

Figure 13:
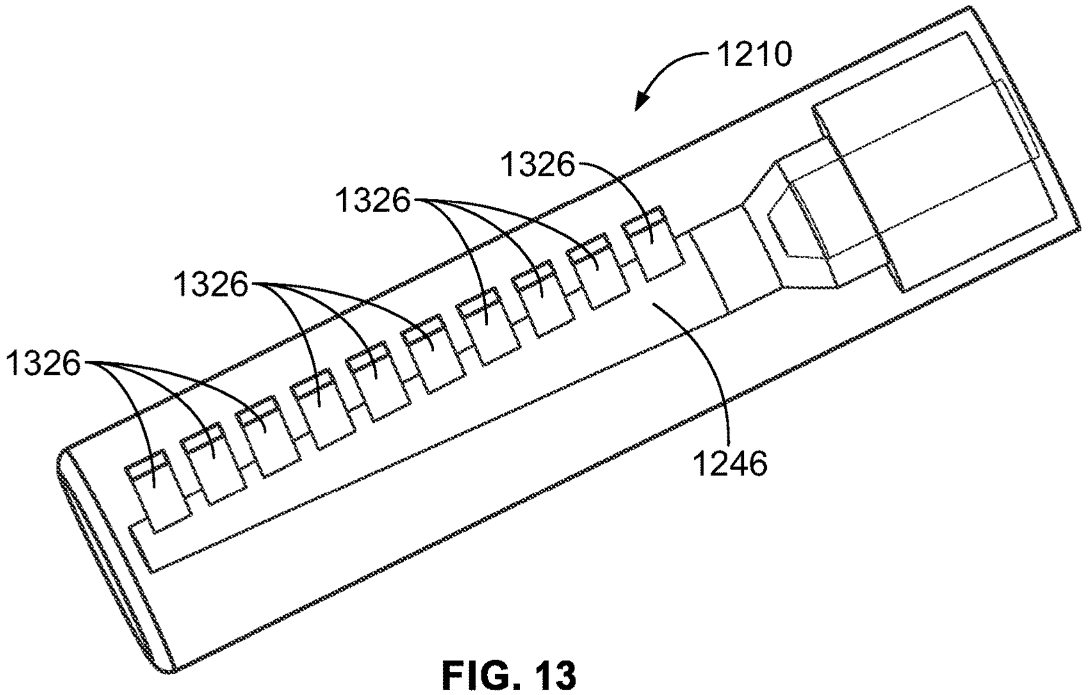
FIG. 13 illustrates another embodiment of the spray nozzle device shown in FIG. 12.

FIG. 13 illustrates another embodiment of the spray nozzle device 1210 shown in FIG. 12. The spray nozzle device 1210 shown in FIG. 13 is longer than the spray nozzle device 1210 shown in FIG. 12, and includes several more delivery nozzles (all labeled 1326 in FIG. 13). The nozzles 1326 in the device 1210 are spaced apart from each other along the flow direction or directions that are parallel to the center axis of the device 1210. The interior chamber 1246 of the device 1210 still has the tapered shape described above.

Figure 14:
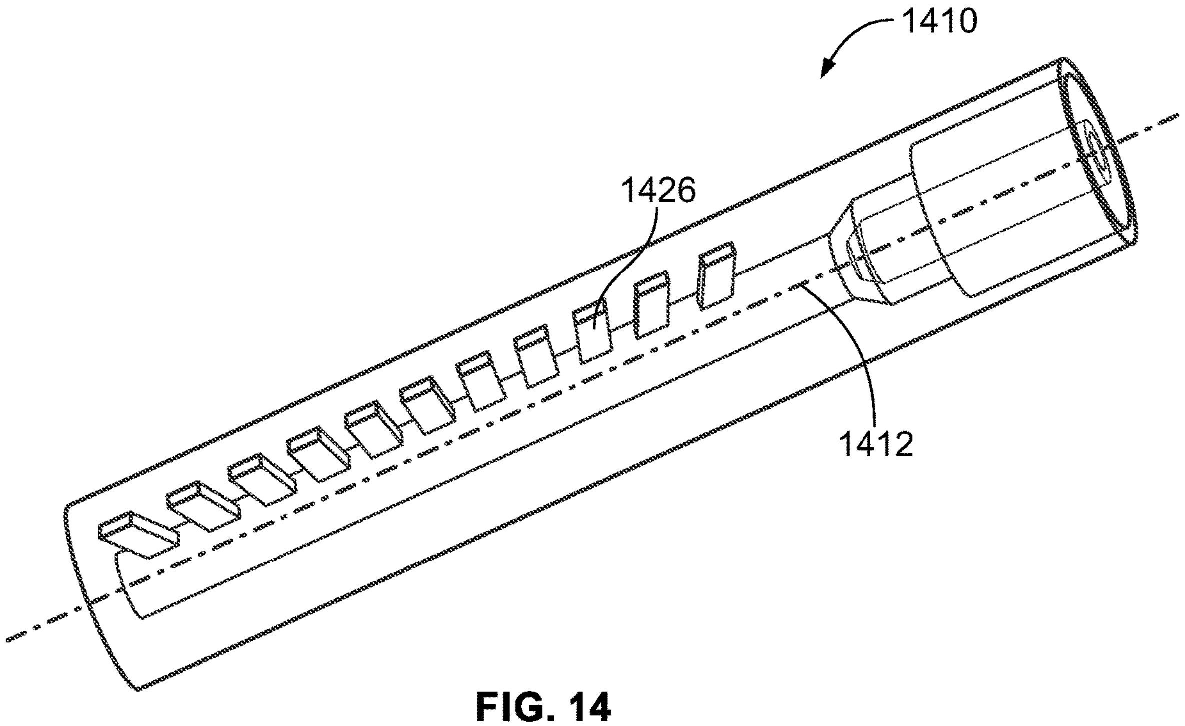
FIG. 14 illustrates a perspective view of another embodiment of an atomizing spray nozzle device.
Figure 15:
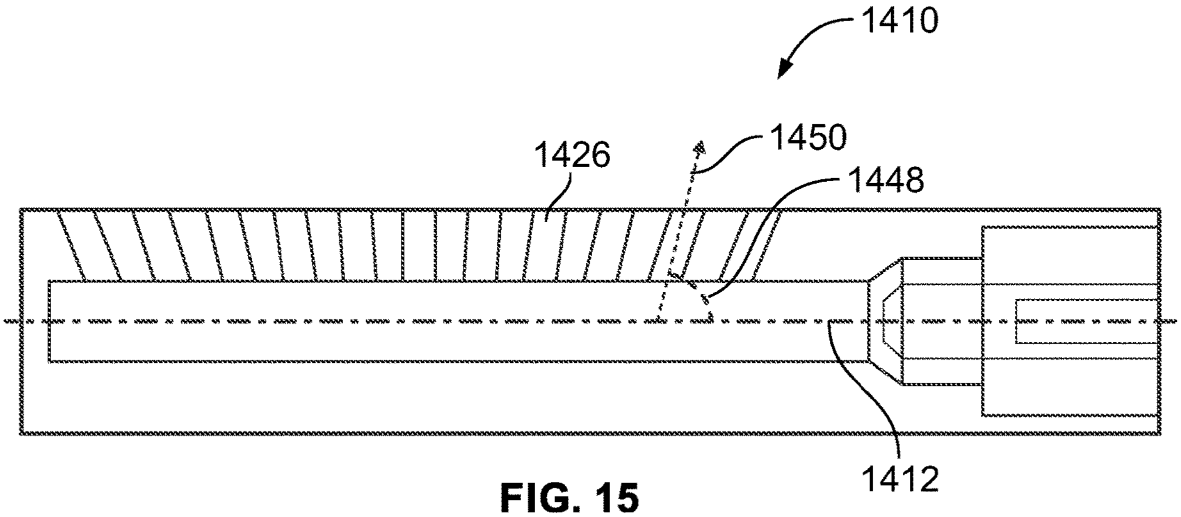
FIG. 15 illustrates a side view of the atomizing spray nozzle device shown in FIG. 14.

FIG. 14 illustrates a perspective view of another embodiment of a spray nozzle device 1410. FIG. 15 illustrates a side view of the spray nozzle device 1410 shown in FIG. 14. The spray nozzle device 1410 is similar to the spray nozzle devices described herein in that the spray nozzle device 1410 includes a housing that defines an interior chamber, inlets that receive materials forming a multi-phase mixture, an atomizing housing zone, and a plenum housing portion. One difference between the spray nozzle device 1410 and the other spray nozzle devices described herein is the different orientations of spray nozzles 1426 of the device 1410. As shown in FIGS. 14 and 15, the delivery nozzles 1426 are oriented at different angles 1448 with respect to a center axis 1412 of the spray nozzle device 1410. The orientation of each delivery nozzle 1426 can be represented by a direction 1450 in which the delivery nozzle 1426 is oriented or a center axis 1450 of the delivery nozzle 1426.

For example, the delivery nozzle 1426 that is farthest upstream relative to the other delivery nozzles 1426 along the flow direction in the spray nozzle device 1410 is oriented at the smallest acute angle 1448 relative to the center axis 1412. The delivery nozzle 1426 that is farthest downstream of the other delivery nozzles 1426 is oriented at the largest obtuse angle 1448 relative to the center axis 1412. The delivery nozzles 1426 located between the farthest upstream and farthest downstream nozzles 1426 are located at different angles 1448, with each delivery nozzle 1426 that is next along the flow direction being oriented at a larger angle 1448 relative to the preceding nozzles 1426.

These orientations of the delivery nozzles 1426 provide for a fan-like arrangement of the nozzles 1426. This arrangement can provide for a larger coverage area that is sprayed by the multi-phase mixture exiting the nozzles 1426.

Figure 16:
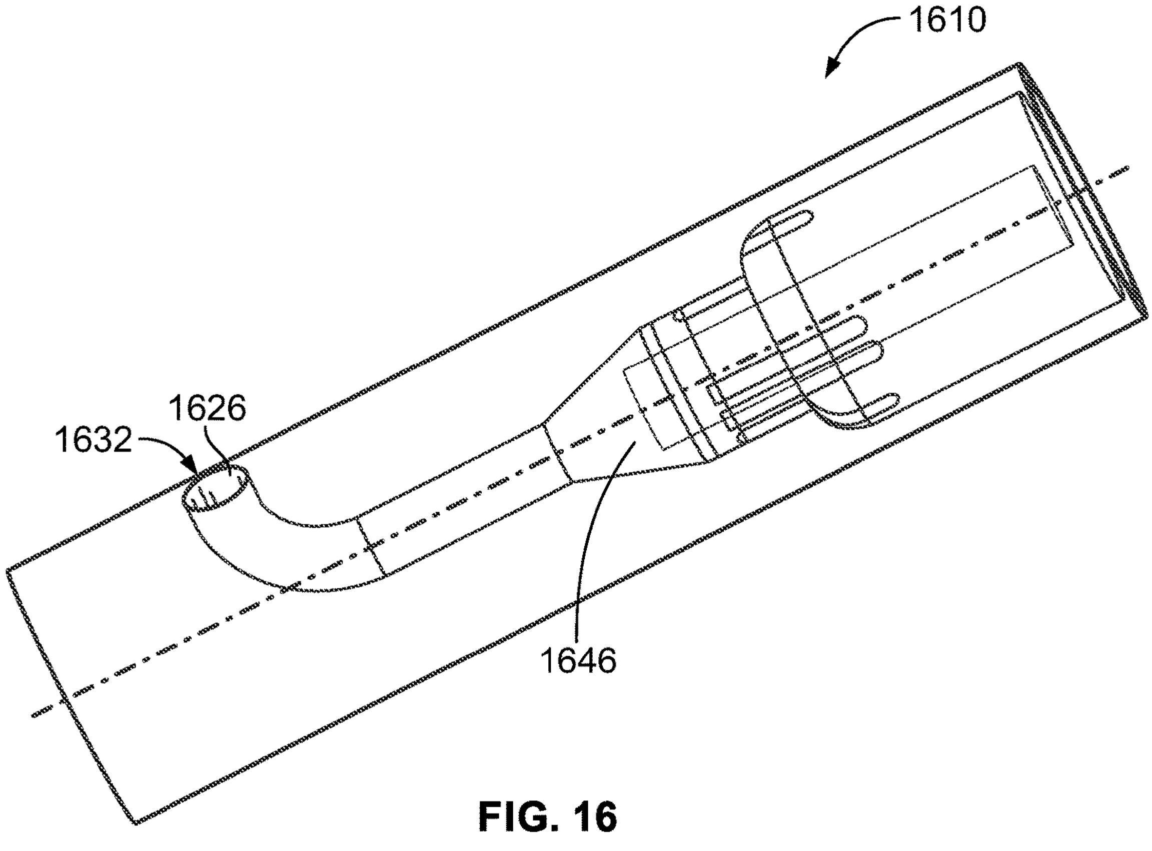
FIG. 16 illustrates a perspective view of another embodiment of an atomizing spray nozzle device.
Figure 17:
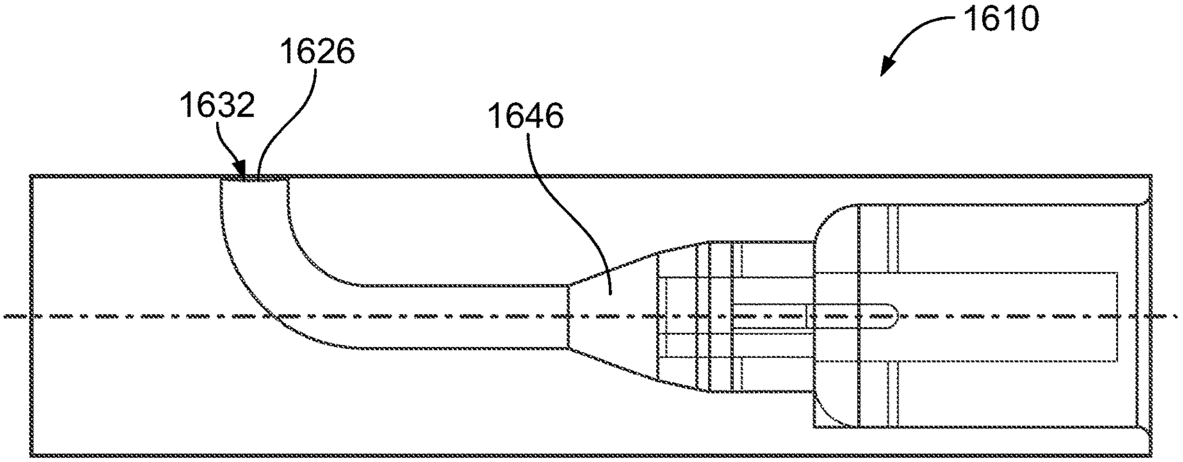
FIG. 17 illustrates a side view of the atomizing spray nozzle device shown in FIG. 16.

FIG. 16 illustrates a perspective view of another embodiment of a spray nozzle device 1610. FIG. 17 illustrates a side view of the spray nozzle device 1610 shown in FIG. 16. The spray nozzle device 1610 is similar to the spray nozzle device 510 shown in FIGS. 5 and 6, except for the shape of the plenum housing portion and delivery nozzle. As shown in FIGS. 16 and 17, an interior chamber or plenum 1646 defined by the housing of the spray nozzle device 1610 has a shape that is curved toward the exterior surface of the spray nozzle device 1610. An outer opening 1632 forms a delivery nozzle 1626 of the device 1610 through which the multi-phase mixture is sprayed onto components of the machine 200. The materials forming this mixture are fed into the plenum 1646 through the inlets described above in connection with the device 510, are atomized and mixed, and flow through the interior chamber 1646 and out of the device 1610 through the opening 1632.

Figure 18:
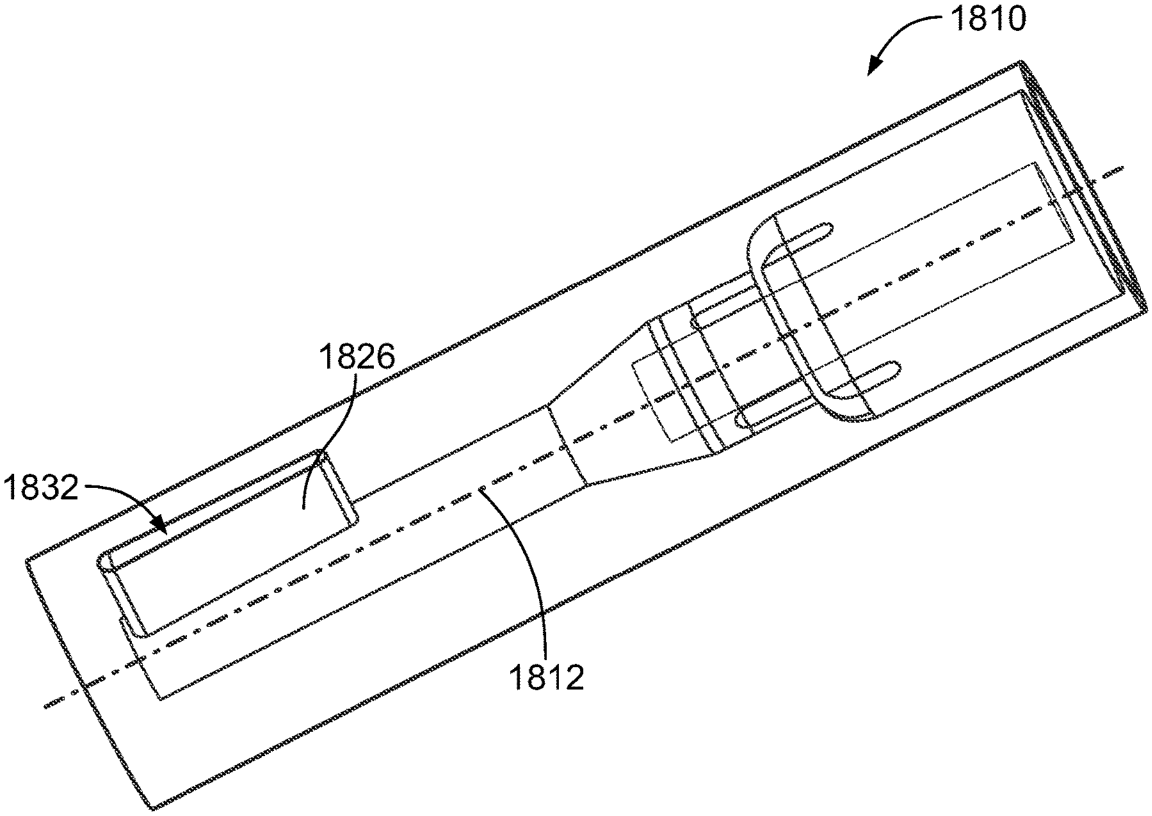
FIG. 18 illustrates a perspective view of another embodiment of an atomizing spray nozzle device.
Figure 19:
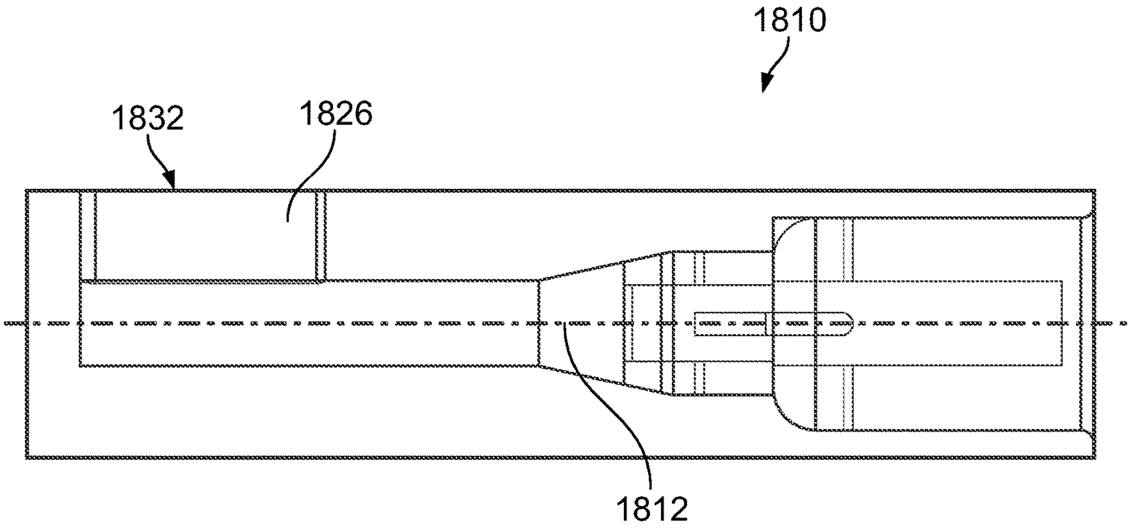
FIG. 19 illustrates a side view of the atomizing spray nozzle device shown in FIG. 18.

FIG. 18 illustrates a perspective view of another embodiment of a spray nozzle device 1810. FIG. 19 illustrates a side view of the spray nozzle device 1810 shown in FIG. 18. Like the other spray nozzle devices described herein, the spray nozzle device 1810 can be used in place of the spray nozzle device 110 described above. The device 1810 is similar to the spray nozzle device 510 shown in FIGS. 5 and 6, except for the shape of a delivery nozzle 1826. As shown in FIGS. 18 and 19, the nozzle 1826 is a radial slot outlet that provides a spray for improved radial coating of a component within the machine 200. The nozzle 1826 has an outer opening 1832 through which the multi-phase mixture exits the device 1810. This opening 1832 is in the shape of an elongated slot, with the slot being elongated along a direction that is parallel to a center axis 1812 of the device 1810. After insertion of the spray nozzle device 1810 in the machine 200, the radial slot opening 1832 on the delivery nozzle 1826 can be oriented perpendicular to the center line of the machine 200 (e.g., the turbine engine) and/or parallel to the radius of the machine 200 (e.g., the turbine engine).

A method for creating one or more of the spray devices disclosed herein can include using additive forming (e.g., three-dimensional printing) to form a single housing body that is the spray device, or to form multiple housings that are joined together to form the spray device.

Figure 20:
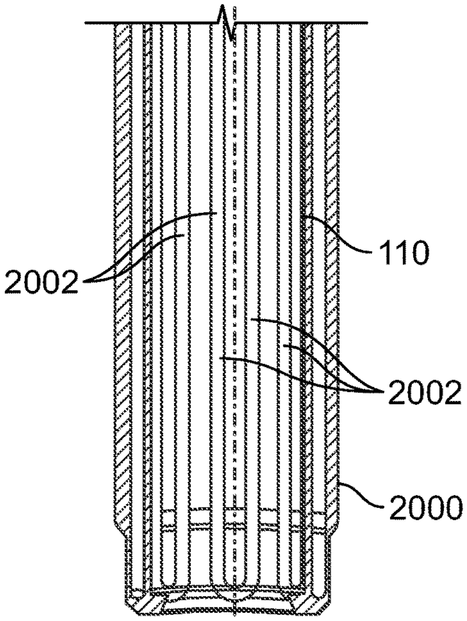
FIG. 20 illustrates one embodiment of a partial view of a jacket assembly.
Figure 21:
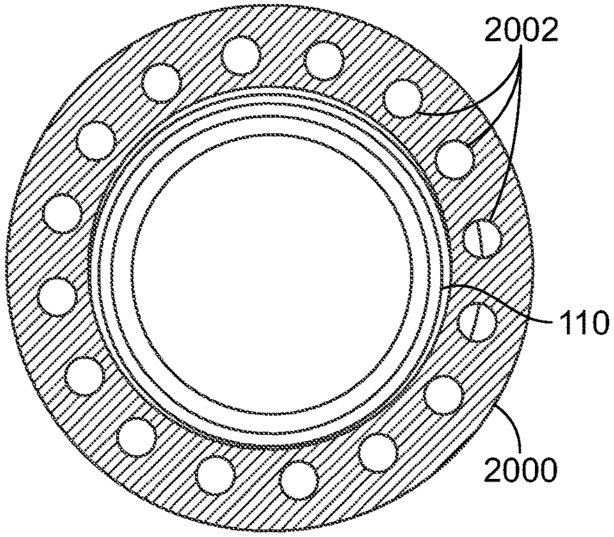
FIG. 21 illustrates a cross-sectional view of the jacket assembly shown in FIG. 20.

FIG. 20 illustrates one embodiment of a partial view of a jacket assembly 2000. FIG. 21 illustrates a cross-sectional view of the jacket assembly 2000. The assembly 2000 can include a flexible or semi-flexible body that extends around the exterior of one or more of the spray delivery devices (e.g., 110) described herein without blocking the inlets or delivery nozzles of the devices. The assembly 2000 includes several conduits 2002 through which a temperature-modifying substance can flow. For example, a coolant (e.g., liquid nitrogen) can be placed in and/or flow through the conduits 2002 to reduce or maintain a temperature of the materials flowing in the spray delivery device inside the assembly 2000. Optionally, a heated fluid can be placed in and/or flow through the conduits 2002 to increase or maintain a temperature of the materials flowing in the spray delivery device inside the assembly 2000.

Use of the assembly 2000 can allow for the spray delivery devices to be used in a range of environments throughout the world having widely varying ambient temperatures. Additionally, the assembly 2000 can assist in preventing residual heat in the machine 200 from preventing the restorative coatings from being applied (e.g., by cooling the coatings). For example, some large commercial turbine engines can take a long time to cool down. If the spray is cooled, then it may not be necessary to wait for the turbine engine to cool to ambient temperature before the coating is applied. The assembly 2000 can be used to cool the mixture prior to introduction of the mixture to the delivery nozzles of the spray devices, can be used to cool the atomizing gas prior to atomizing the mixture in the spray devices, to both cool the mixture and the atomizing gas, etc.

The assembly 2000 can be used to keep the temperature of the atomizing gas and the two-phase mixture within certain desired limits. If the gas temperature is too high, or the two-phase mixture is too high, the quality of the coating can be reduced. If the temperature deviates from the desired temperature range of operating for the spray process, there can be a change in the size of the droplets, the composition of the mixture, the rate of evaporation of the liquid post atomizing and prior to impact of the two-phase droplets on the surface that is being coated. Use of the assembly 2000 can keep the temperatures of the mixture and the gas within desired limits.

Figure 22:
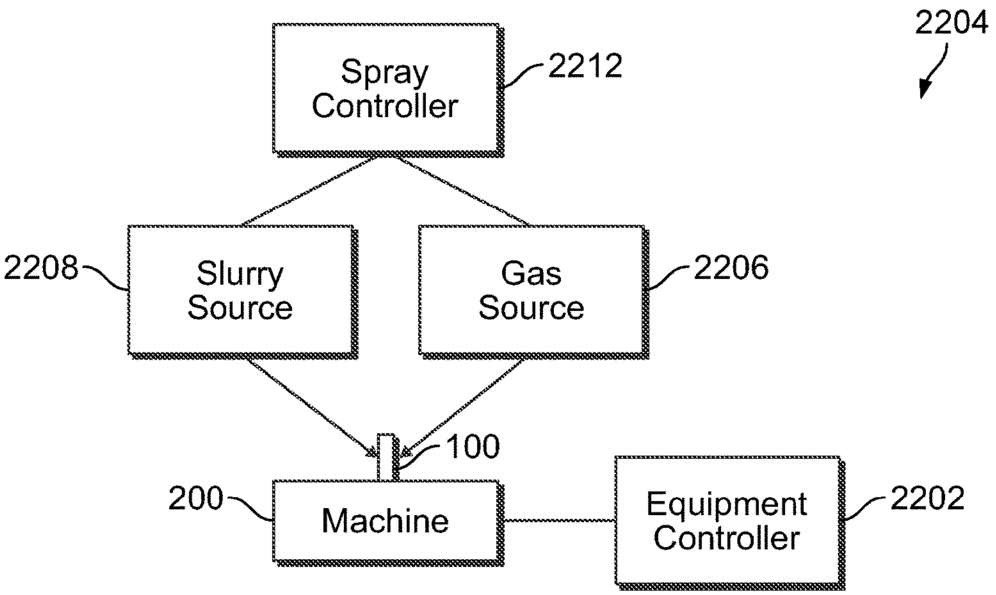
FIG. 22 illustrates one embodiment of a control system.

FIG. 22 illustrates one embodiment of a control system 2200. The control system 2200 can be used to control operation of the machine 200 during spraying of a restorative coating using one or more of the spray devices described herein. The control system 2200 includes an equipment controller 2202 that represents hardware circuitry that includes and/or is connected with one or more processors (e.g., one or more microprocessors, field programmable gate arrays, and/or integrated circuits). These processors control operation of the machine 200, such as by changing a speed at which the machine 200 operates. The equipment controller 2202 can be connected with the machine 200 through one or more wired and/or wireless connections to change the speed at which the machine 200 operates, and optionally to activate or deactivate the machine 200.

A spraying system 2204 controls delivery of the materials (e.g., ceramic particles, liquids, and/or gases) to the spray nozzle device 110 via the spray access tool 100 that is inserted into the machine 200. The spraying system 2204 can control the flow rate, pressure, and/or duration at which a liquid (e.g., water or alcohol), solid (e.g., ceramic particles), and/or gas (e.g., air) are supplied to the device 110 from one or more sources 2206, 2208 such as tanks or other containers. Optionally, the solid and liquid can be provided from a single source (e.g., a source of the mixture).

The spraying system 2204 can include a spray controller 2212 that controls a pressure of a two-phase mixture of ceramic-liquid droplets in a carrier gas provided to the device 110, a pressure of a gas provided to the device 110, a flow rate of the mixture provided to the device 110, a flow rate of the gas provided to the device 110, a temporal duration at which the mixture is provided to the device 110, a temporal duration at which the gas is provided to the device 110, a time at which the mixture is provided to the device 110, and/or a time at which the gas provided to the device 110.

The spray controller 2212 represents hardware circuitry that includes and/or is connected with one or more processors, and one or more pumps, valves, or the like of the spraying system 2204, for controlling the flow of materials to the device 110 for spraying a restorative coating onto the interior of the machine 200. The controller 2212 can generate signals communicated to the valves, pumps, etc. via one or more wired and/or wireless connections to control delivery of the materials to the device 110.

In one embodiment, the controllers 2202, 2212 operate in conjunction with each other to add the restorative coating to the interior of the machine 200. For example, the controller 2202 can begin rotating the machine 200 at a slow speed (e.g., no more than one hundred revolutions per minute) prior to or concurrently with the controller 2212 beginning to direct the flow of the mixture and gas to the device 110. The device 110 can then remain stationary inside the machine 200 while the mixture and gas are sprayed onto the interior of the machine 200 during slow rotation of the machine 200. In one embodiment, the device 110 does not move relative to the exterior of the machine 200 during rotation of interior components of the machine 200 and spraying of the restorative coating.

Figure 24:
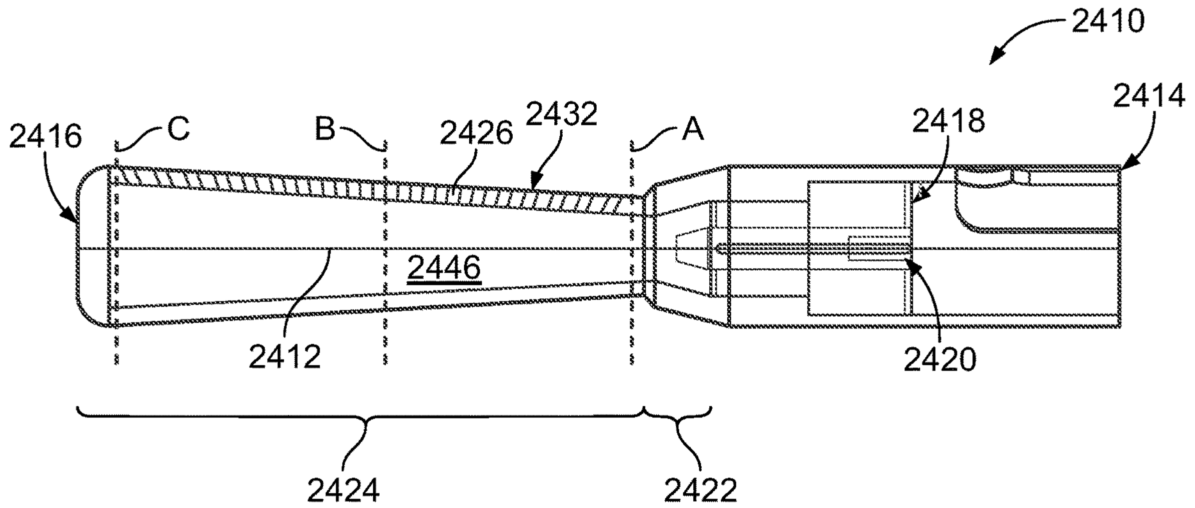
FIG. 24 schematically illustrates spraying of the coating by several nozzles of a spray device according to one example.

FIG. 24 illustrates a side view of another embodiment of an atomizing spray nozzle device 2410. The spray nozzle device 2410 can represent or be used in place of the spray nozzle device 110 shown in FIGS. 1 through 4. The spray nozzle device 2410 is elongated along a center axis 2412 from a feed end 2414 to an opposite delivery end 2416. The spray nozzle device 2410 is formed from one or more housings that form an interior plenum chamber 2446 extending between the feed end 2414 and the delivery end 2416. The interior plenum chamber 2446 directs the flow of the materials forming the two-phase mixture of ceramic-liquid droplets in a carrier gas through and out of the spray nozzle device 2410. The plenum 2446 is elongated in or along the center axis 2412 (also referred to as an axial direction of the device 2410).

The spray nozzle device 2410 includes several inlets 2418, 2420 extending from the feed end 2414 toward (but not extending all the way to) the delivery end 2416. These inlets 2418, 2420 receive different phases of the materials that are atomized within the spray nozzle device 2410 to form the airborne mixture that is sprayed onto the surfaces of the machine 200. In the illustrated embodiment, one inlet 2418 extends around, encircles, or circumferentially surrounds the other inlet 2420. The inlet 2418 can be referred to as the outer inlet and the inlet 2420 can be referred to as the inner inlet. Alternatively, the inlets 2418, 2420 may be disposed side-by-side or in another spatial relationship. While only two inlets 2418, 2420 are shown, more than two inlets can be provided.

The inlets 2418, 2420 may each be separately fluidly coupled with different conduits of a spraying system that supplies the different phases of materials to the spray nozzle device 2410. These conduits can extend through or be coupled with separate conduits in the access tool 100 that are separately coupled with the different inlets 2418, 2420. This keeps the different phase materials separate from each other until the materials are combined and atomized inside the spray nozzle device 2410.

The spray nozzle device 2410 includes an atomizing zone housing 2422 that is fluidly coupled with the inlets 2418, 2420. For example, the inlets 2418, 2420 may terminate and be open at or within an interior chamber of the housing 2422, as shown in FIG. 24. The atomizing zone housing 2422 includes an outer housing that extends from the inlets 2418, 2420 toward, but not all the way to, the delivery end 2416 of the spray nozzle device 2410. The atomizing zone housing 2422 defines an interior chamber in the spray nozzle device 2410 into which the different phase materials in the inlets 2418, 2420 are delivered from the inlets 2418, 2420.

The annular inlet 2418 delivers gas to the atomizing zone housing 2422. The two-phase fluid, or mixture, of ceramic particles and liquid is delivered through the central inlet or tube 2420 to the atomizing zone housing 2422. Two-phase droplets of ceramic particles and liquid are generated in the atomizing zone housing 2422 and the atomizing gas accelerates the two-phase droplets from the atomizing zone housing 2422 to the manifold or plenum housing portion 2424. In one embodiment, atomizing is complete before the droplets enter the plenum housing portion 2424.

The two-phase mixture of ceramic-liquid droplets in a carrier gas is atomized during mixing with the gas in the atomizing zone housing 2422 to form a two-phase mixture of ceramic-liquid droplets in a carrier gas. This two-phase mixture of ceramic-liquid droplets in a carrier gas flows out of the atomizing zone housing 2422 into a plenum housing portion 2424 of the spray nozzle device 2410.

A plenum housing portion 2424 is another part of the housing of the spray nozzle device 2410 that is fluidly coupled with the atomizing zone housing 2422. The plenum housing portion 2424 extends from the atomizing zone housing 2422 to the delivery end 2416 of the spray nozzle device 2410, and includes the plenum chamber 2446. The plenum housing portion 2424 receives the two-phase mixture of ceramic-liquid droplets in a carrier gas from the atomizing zone housing 2422.

One or more delivery nozzles are fluidly coupled with the plenum housing portion 2424. In the illustrated embodiment, the spray nozzle device 2410 includes nineteen nozzles 2426, although a single nozzle or a different number of two or more nozzles may be provided instead.

In the illustrated embodiment, the nozzles 2424 are positioned or oriented in a fan-like arrangement, similar to the nozzles 1426 of the device 1410 shown in FIGS. 14 and 15. This arrangement can cause the two-phase mixture of ceramic-liquid droplets in a carrier gas exiting the device 2410 to extend over a broader area during spraying of the equipment 200 relative to devices that do not have the nozzles arranged as shown in FIG. 24.

The nozzles 2426 terminate at openings 2432 that provide outlets through which the two-phase mixture of ceramic-liquid droplets in a carrier gas is delivered from the plenum housing portion 2424 out of the device 2410 and onto one or more surfaces of the target object of the machine 200 as a coating or restorative coating on the machine 200. The openings 2432 can be circular openings, or have another shape. The nozzles 2426 can deliver the two-phase mixture of ceramic-liquid droplets in a carrier gas at pressures of 0.5 to three hundred pounds per square inch.

In one embodiment, the nozzles 2426 are small such that the nozzles 2426 further atomize the two-phase mixture of ceramic-liquid droplets in a carrier gas. The gas moving through the delivery spray device 2410 can carry the two-phase mixture of ceramic-liquid droplets in a carrier gas out of the nozzles 2426 toward the surfaces onto which the restorative coating is being formed by the two-phase mixture of ceramic-liquid droplets in a carrier gas.

The spray nozzle device 2410 is designed to provide a conduit for at least two fluid media. The first fluid is a two-phase mixture of ceramic particles in a liquid, such as yttria stabilized zirconia particles in alcohol. The particles are typically less than ten microns in size, and can be as small as less than 0.05 microns in size. The second fluid is an atomizing gas that generates a spray by disintegrating the two-phase mixture of ceramic particles in a liquid into two-phase droplets of the same liquid (such as alcohol) and ceramic particles. The conduit of the nozzle spray device 2410 is designed such that little to no evaporation of the fluid occurs during the transfer, such that the composition of the two-phase ceramic particle-liquid medium is preserved to the region of atomizing in the nozzles 2426 and the generation of the two-phase droplets of the ceramic mixture, such as alcohol and yttria stabilized zirconia particles. The droplets are created within the spray nozzle device 2410 prior to delivery of the materials onto the part being coated. The openings of the delivery nozzles 2426 through which the ceramic mixture exits the device 2410 operate to direct the spray and control the spray angle and width, and thereby provide a uniform coating.

In one embodiment, the plenum housing portion 2424 of the device 2410 has a tapered shape such that the cross-sectional area of the interior chamber of the device 2410 through which the ceramic mixture flows (e.g., the plenum chamber 2446) at or near the intersection between the atomizing housing portion 2422 and the plenum housing portion 2424 (marked by plane A-A in FIG. 24) is smaller than a plane B-B located midway along the length of the plenum chamber 2446, which is smaller than a plane C-C located at the distal end of the plenum chamber 2446. This tapered shape of the plenum chamber 2446 can be referred to as an increasing taper shape, as the cross-sectional size of the plenum chamber 2446 is larger at distances along the center axis 2412 that are closer to the delivery end 2416 than the feed end 2414. The increasing taper shape of the plenum chamber 2446 can provide for a more even distribution of the ceramic mixture material (or other material) that is sprayed from the nozzles 2426. For example, the amount of material and/or rate at which the material exits each of the nozzles 2426 may be more equal to each other when using the spray device 2410 than when using one or more other spray devices.

Figure 25:
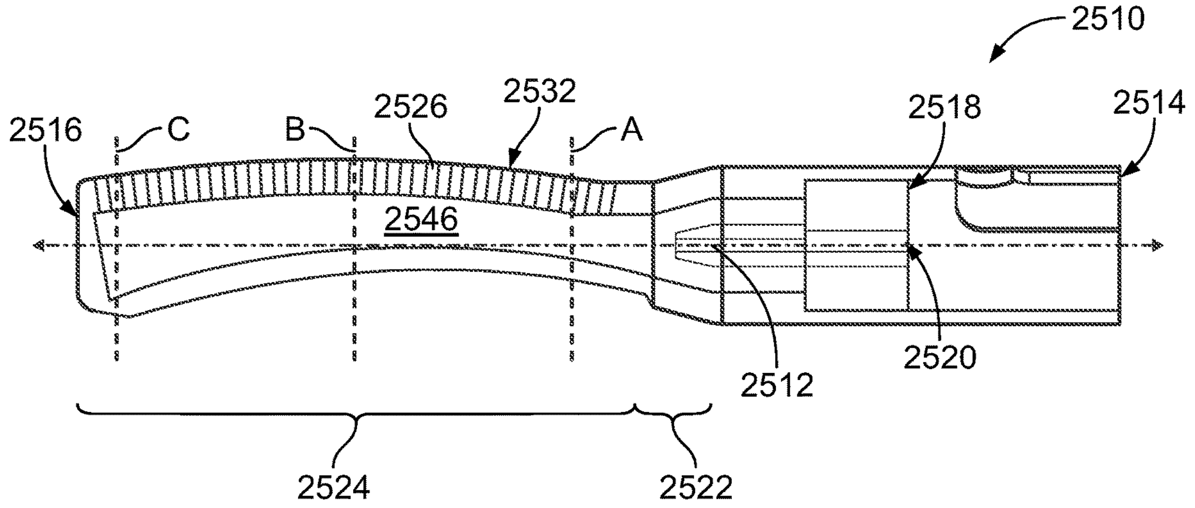
FIG. 25 illustrates a side view of another embodiment of an atomizing spray nozzle device.

FIG. 25 illustrates a side view of another embodiment of an atomizing spray nozzle device 2510. The spray nozzle device 2510 can represent or be used in place of the spray nozzle device 110 shown in FIGS. 1 through 4. The spray nozzle device 2510 has an elongated shape from a feed end 2514 to an opposite delivery end 2516. The spray nozzle device 2510 is formed from one or more housings that form an interior plenum chamber 2546 extending between the feed end 2514 and the delivery end 2516. The interior plenum chamber 2546 directs the flow of the materials forming the two-phase mixture of ceramic-liquid droplets in a carrier gas through and out of the spray nozzle device 2510.

The spray nozzle device 2510 includes several inlets 2518, 2520 extending from the feed end 2514 toward (but not extending all the way to) the delivery end 2516. These inlets 2518, 2520 receive different phases of the materials that are atomized within the spray nozzle device 2510 to form the airborne mixture that is sprayed onto the surfaces of the machine 200, as described herein. In the illustrated embodiment, one inlet 2518 extends around, encircles, or circumferentially surrounds the other inlet 2520, also as described herein. Alternatively, the inlets 2518, 2520 may be disposed in another spatial relationship and/or another number of inlets may be provided.

The spray nozzle device 2510 includes an atomizing zone housing 2522 that is fluidly coupled with the inlets 2518, 2520. For example, the inlets 2518, 2520 may terminate and be open at or within an interior chamber of the housing 2522. The atomizing zone housing 2522 includes an outer housing that extends from the inlets 2518, 2520 toward, but not all the way to, the delivery end 2516 of the spray nozzle device 2510. The atomizing zone housing 2522 defines an interior chamber in the spray nozzle device 2510 into which the different phase materials in the inlets 2518, 2520 are delivered from the inlets 2518, 2520.

The inlets 2518, 2520 can deliver gas and two-phase fluids or slurries to the atomizing zone housing 2522, as described herein. The gas from the inlet 2518 creates droplets from the two-phase mixture from the atomizing zone housing 2522, and accelerates the two-phase droplets from the atomizing zone housing 2522 to a manifold or plenum housing portion 2524. In one embodiment, atomizing is complete before the droplets enter the plenum housing portion 2524.

The plenum housing portion 2524 is coupled with the atomizing zone housing 2522. The plenum housing portion 2524 extends from the atomizing zone housing 2522 to the delivery end 2516 of the spray nozzle device 2510, and includes the plenum chamber 2546. The plenum housing portion 2524 receives the two-phase mixture of ceramic-liquid droplets in a carrier gas from the atomizing zone housing 2522.

One or more delivery nozzles are fluidly coupled with the plenum housing portion 2524. In the illustrated embodiment, the spray nozzle device 2510 includes twenty-one nozzles 2526, although a single nozzle or a different number of two or more nozzles may be provided instead.

The nozzles 2526 terminate at openings 2532 that provide outlets through which the two-phase mixture of ceramic-liquid droplets in a carrier gas is delivered from the plenum housing portion 2524 out of the device 2510 and onto one or more surfaces of the target object of the machine 200 as a coating or restorative coating on the machine 200. The openings 2532 can be circular openings, or have another shape. The nozzles 2526 can deliver the two-phase mixture of ceramic-liquid droplets in a carrier gas at pressures of ten to three hundred pounds per square inch and, in one embodiment, as a pressure of less than one hundred pounds per square inch for both the mixture delivery and the gas delivery. In one embodiment, the nozzles 2526 are small such that the nozzles 2526 further atomize the two-phase mixture of ceramic-liquid droplets in a carrier gas, as described herein. The gas moving through the delivery spray device 2410 can carry the two-phase mixture of ceramic-liquid droplets in a carrier gas out of the nozzles 2426 toward the surfaces onto which the restorative coating is being formed by the two-phase mixture of ceramic-liquid droplets in a carrier gas. Each of the nozzles 2526 may have the same (within manufacturing tolerances) ratio of length of the nozzle 2526 (from the intersection between the plenum chamber 2546 to the opening 2532) to the diameter of the opening 2532 to provide for a more even distribution of the two-phase mixture of ceramic-liquid droplets in a carrier gas across all nozzles 2526 (relative to one or more other spray devices described herein).

In the illustrated embodiment, the plenum housing portion 2524 and the plenum chamber 2546 have bent shapes. For example, the device 2510 is elongated between the ends 2514, 2516 along an axis 2512. The plenum housing portion 2524 and/or the plenum chamber 2546 have a convex bend or shape relative to the axis 2512. For example, the housing portion 2524 and the plenum chamber 2546 both bend away from the axis 2512. This convex shape of the plenum housing portion 2524 also causes the nozzles 2524 to be positioned or oriented in a fan-like arrangement, similar to the nozzles 1426 of the device 1410 shown in FIGS. 14 and 15. This arrangement can cause the ceramic mixture exiting the device 2510 to extend over a broader area during spraying of the equipment 200 relative to devices that do not have the nozzles arranged as shown in FIG. 25.

The spray nozzle device 2510 is designed to provide a conduit for at least two fluid media, as described above in connection with other spray nozzle devices. The openings 2532 of the delivery nozzles 2526 through which the ceramic mixture exits the device 2510 operate to direct the spray and control the spray angle and width, and thereby provide a uniform coating.

In one embodiment, the plenum housing portion 2524 of the device 2510 also has an increasing taper shape. For example, the cross-sectional area of the interior chamber of the device 2510 through which the ceramic mixture flows (e.g., the plenum chamber 2546) at or near the intersection between the atomizing housing portion 2522 and the plenum housing portion 2524 (marked by plane A-A in FIG. 25) is smaller than the cross-sectional area at a plane B-B located midway along the length of the plenum chamber 2546, which is smaller than the cross-sectional area at a plane C-C located at the distal end of the plenum chamber 2546. The increasing taper shape of the plenum chamber 2546 can provide for a more even distribution of the ceramic mixture material (or other material) that is sprayed from the nozzles 2526. For example, the amount of material and/or rate at which the material exits each of the nozzles 2526 may be more equal to each other when using the spray device 2510 than when using one or more other spray devices.

Figure 26:
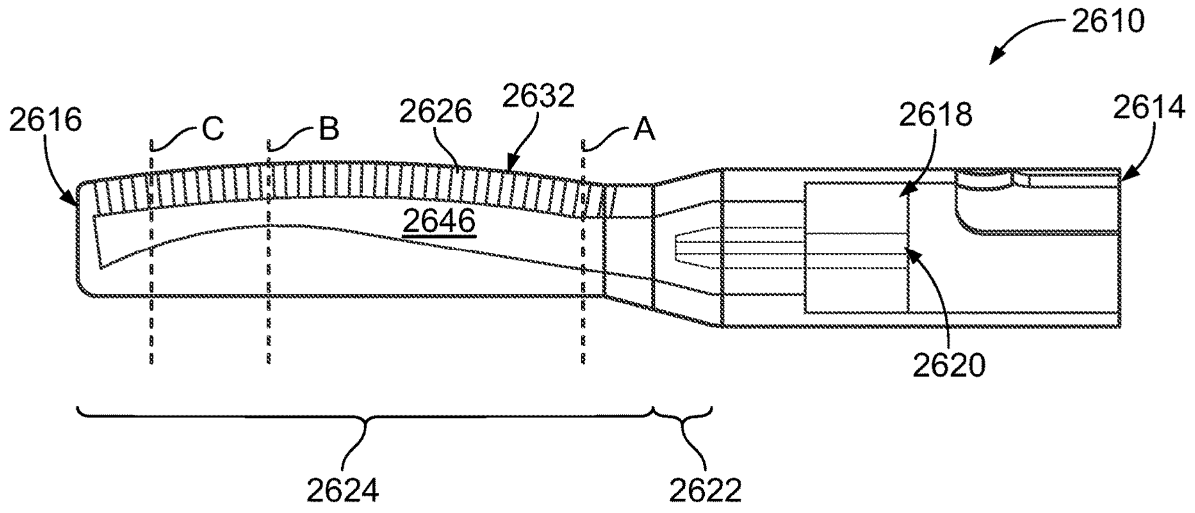
FIG. 26 illustrates a side view of another embodiment of an atomizing spray nozzle device.

FIG. 26 illustrates a side view of another embodiment of an atomizing spray nozzle device 2610. The spray nozzle device 2610 is designed to provide a conduit for at least two fluid media, as described above in connection with other spray nozzle devices. The spray nozzle device 2610 can represent or be used in place of the spray nozzle device 110 shown in FIGS. 1 through 4. The spray nozzle device 2610 has an elongated shape from a feed end 2614 to an opposite delivery end 2616. The spray nozzle device 2610 is formed from one or more housings that form an interior plenum chamber 2646 extending between the feed end 2614 and the delivery end 2616. The interior plenum chamber 2646 directs the flow of the materials forming the two-phase mixture of ceramic-liquid droplets in a carrier gas through and out of the spray nozzle device 2610.

The spray nozzle device 2610 includes several inlets 2618, 2620 extending from the feed end 2614 toward (but not extending all the way to) the delivery end 2616. These inlets 2618, 2620 receive different phases of the materials that are atomized within the spray nozzle device 2610 to form the airborne mixture that is sprayed onto the surfaces of the machine 200, as described herein. In the illustrated embodiment, one inlet 2618 extends around, encircles, or circumferentially surrounds the other inlet 2620, also as described herein. Alternatively, the inlets 2618, 2620 may be disposed in another spatial relationship and/or another number of inlets may be provided.

The spray nozzle device 2610 includes an atomizing zone housing 2622 that is fluidly coupled with the inlets 2618, 2620. For example, the inlets 2618, 2620 may terminate and be open at or within an interior chamber of the housing 2622. The atomizing zone housing 2622 includes an outer housing that extends from the inlets 2618, 2620 toward, but not all the way to, the delivery end 2616 of the spray nozzle device 2610.

The inlets 2618, 2620 can deliver gas and two-phase fluids or slurries to the atomizing zone housing 2622, as described herein. The gas accelerates the two-phase droplets from the atomizing zone housing 2622 to a manifold or plenum housing portion 2624. In one embodiment, atomizing is complete before the droplets enter the plenum housing portion 2624.

The plenum housing portion 2624 is coupled with the atomizing zone housing 2622. The plenum housing portion 2624 extends from the atomizing zone housing 2622 to the delivery end 2616 of the spray nozzle device 2610, and includes the plenum chamber 2646. The plenum housing portion 2624 receives the two-phase mixture of ceramic-liquid droplets in a carrier gas from the atomizing zone housing 2622.

One or more delivery nozzles 2626 are fluidly coupled with the plenum housing portion 2624. In the illustrated embodiment, the spray nozzle device 2610 includes twenty-one nozzles 2626, although a single nozzle or a different number of two or more nozzles may be provided instead.

The nozzles 2626 terminate at openings 2632 that provide outlets through which the two-phase mixture of ceramic-liquid droplets in a carrier gas is delivered from the plenum housing portion 2624 out of the device 2610 and onto one or more surfaces of the target object of the machine 200 as a coating or restorative coating on the machine 200. The openings 2632 can be circular openings, or have another shape. The nozzles 2626 can deliver the two-phase mixture of ceramic-liquid droplets in a carrier gas at pressures of ten to three hundred pounds per square inch and, in one embodiment, as a pressure of less than one hundred pounds per square inch for both the mixture delivery and the gas delivery. In one embodiment, the nozzles 2626 are small such that the nozzles 2626 further atomize the two-phase mixture of ceramic-liquid droplets in a carrier gas, as described herein. The gas moving through the delivery spray device 2610 can carry the two-phase mixture of ceramic-liquid droplets in a carrier gas out of the nozzles 2626 toward the surfaces onto which the restorative coating is being formed by the two-phase mixture of ceramic-liquid droplets in a carrier gas. Each of the nozzles 2626 may have the same (within manufacturing tolerances) aspect ratio of length of the nozzle 2626 (from the intersection between the plenum chamber 2646 to the opening 2632) to the diameter of the opening 2632 to provide for a more even distribution of the two-phase mixture of ceramic-liquid droplets in a carrier gas across all nozzles 2626 (relative to one or more other spray devices described herein). Optionally, another aspect ratio may be used for one or all of the nozzles 2626.

In the illustrated embodiment, the plenum chamber 2646 has a bent shape. For example, the plenum chamber 2646 has a convex shape, similar to as described above in connection with the plenum chamber 2546 of the spray nozzle device 2510. This convex shape also causes the nozzles 2624 to be positioned or oriented in a fan-like arrangement, similar to the nozzles 1426 of the device 1410 shown in FIGS. 14 and 15. This arrangement can cause the ceramic mixture exiting the device 2610 to extend over a broader area during spraying of the equipment 200 relative to devices that do not have the nozzles arranged as shown in FIG. 26.

In one embodiment, the plenum chamber 2646 of the device 2610 has a changing size or shape along the length of the plenum chamber 2646. For example, the cross-sectional area of the interior chamber of the device 2610 through which the ceramic mixture flows (e.g., the plenum chamber 2646) at or near the intersection between the atomizing housing portion 2622 and the plenum housing portion 2624 (marked by plane A-A in FIG. 26) is larger than at a plane B-B located closer to the delivery end 2616 along the length of the plenum chamber 2646, which is smaller than the cross-sectional area at a plane C-C located at the distal end of the plenum chamber 2646. The changing size of the plenum chamber 2646 can provide for a more even distribution of the ceramic mixture that is sprayed from the nozzles 2626. For example, the amount of material and/or rate at which the material exits each of the nozzles 2626 may be more equal to each other when using the spray device 2610 than when using one or more other spray devices.

Figure 27:
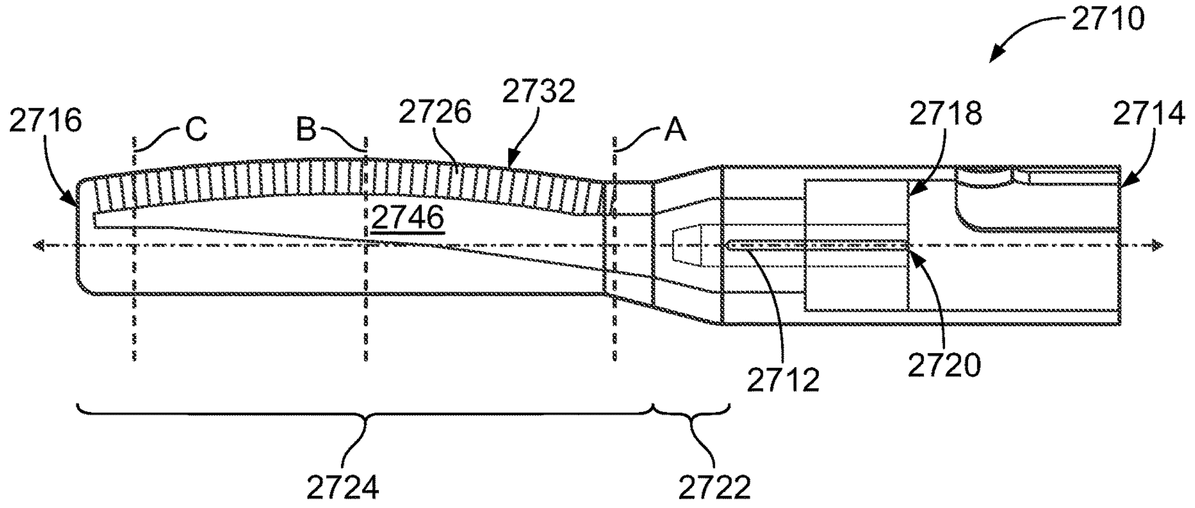
FIG. 27 illustrates a side view of another embodiment of an atomizing spray nozzle device.

FIG. 27 illustrates a side view of another embodiment of an atomizing spray nozzle device 2710. The spray nozzle device 2710 is designed to provide a conduit for at least two fluid media, as described above in connection with other spray nozzle devices. The spray nozzle device 2710 can represent or be used in place of the spray nozzle device 110 shown in FIGS. 1 through 4. The spray nozzle device 2710 has an elongated shape along an axis 2712 from a feed end 2714 to an opposite delivery end 2716. The spray nozzle device 2710 is formed from one or more housings that form an interior plenum chamber 2746 extending between the feed end 2714 and the delivery end 2716. The interior plenum chamber 2746 directs the flow of the materials forming the two-phase mixture of ceramic-liquid droplets in a carrier gas through and out of the spray nozzle device 2710.

The spray nozzle device 2710 includes several inlets 2718, 2720 extending inward from the feed end 2714 toward (but not extending all the way to) the delivery end 2716. These inlets 2718, 2720 receive different phases of the materials that are atomized within the spray nozzle device 2710 to form the two-phase mixture of ceramic-liquid droplets in a carrier gas_that is sprayed onto the surfaces of the machine 200, as described herein. In the illustrated embodiment, one inlet 2718 extends around, encircles, or circumferentially surrounds the other inlet 2720, also as described herein. Alternatively, the inlets 2718, 2720 may be disposed in another spatial relationship and/or another number of inlets may be provided.

The spray nozzle device 2710 includes an atomizing zone housing 2722 that holds part of the plenum chamber 2746 that is fluidly coupled with the inlets 2718, 2720. For example, the inlets 2718, 2720 may terminate and be open at or within an interior chamber of the housing 2722.

The inlets 2718, 2720 can deliver gas and two-phase fluids or slurries to the plenum chamber 2746 in the atomizing zone housing 2722, as described herein. The gas accelerates the two-phase droplets from the atomizing zone housing 2722 to a portion of the plenum chamber 2746 in a manifold or plenum housing portion 2724. In one embodiment, atomizing is complete before the droplets enter the plenum housing portion 2724.

The plenum housing portion 2724 is coupled with the atomizing zone housing 2722. The plenum housing portion 2724 extends from the atomizing zone housing 2722 to the delivery end 2716 of the spray nozzle device 2710. The plenum housing portion 2724 receives the two-phase mixture of ceramic-liquid droplets in a carrier gas from the atomizing zone housing 2722.

One or more delivery nozzles 2726 are fluidly coupled with the plenum chamber 2746 in the plenum housing portion 2724. In the illustrated embodiment, the spray nozzle device 2710 includes twenty-one nozzles 2726, although a single nozzle or a different number of two or more nozzles may be provided instead.

The nozzles 2726 terminate at openings 2732 that provide outlets through which the two-phase mixture of ceramic-liquid droplets in a carrier gas is delivered from the plenum housing portion 2724 out of the device 2710 and onto one or more surfaces of the target object of the machine 200 as a coating or restorative coating on the machine 200. The openings 2732 can be circular openings, or have another shape. The nozzles 2726 can deliver the two-phase mixture of ceramic-liquid droplets in a carrier gas at pressures of ten to three hundred pounds per square inch and, in one embodiment, as a pressure of less than one hundred pounds per square inch for both the mixture delivery and the gas delivery. In one embodiment, the nozzles 2726 are small such that the nozzles 2726 further atomize the two-phase mixture of ceramic-liquid droplets in a carrier gas, as described herein. The gas moving through the delivery spray device 2710 can carry the two-phase mixture of ceramic-liquid droplets in a carrier gas out of the nozzles 2726 toward the surfaces onto which the restorative coating is being formed by the two-phase mixture of ceramic-liquid droplets in a carrier gas. Each of the nozzles 2726 may have the same (within manufacturing tolerances) ratio of length of the nozzle 2726 (from the intersection between the plenum chamber 2746 to the opening 2732) to the diameter of the opening 2732 to provide for a more even distribution of the two-phase mixture of ceramic-liquid droplets in a carrier gas across all nozzles 2726 (relative to one or more other spray devices described herein).

In the illustrated embodiment, the plenum chamber 2746 has a bent shape, similar to the plenum chambers 2546 and 2646 described above. The plenum chamber 2746 also has a decreasing taper, similar to the plenum chamber 1246 described above. For example, the cross-sectional area of the interior chamber 2746 decreases from locations at or near the intersection of the housing portions 2722, 2724 to locations at or near the delivery end 2716. The cross-sectional area of the plenum chamber 2746 at a plane A-A near or at the intersection between the housing portions 2722, 2724 is larger than the cross-sectional area of the chamber 2746 at a plane B-B that is midway along the length of the plenum chamber 2746, which is larger than the cross-sectional area of the chamber 2746 at a plane C-C located at the distal end of the plenum chamber 2746. The reducing size of the plenum chamber 2746 can provide for a more even distribution of the ceramic mixture material (or other material) that is sprayed from the nozzles 2726. For example, the amount of material and/or rate at which the material exits each of the nozzles 2726 may be more equal to each other when using the spray device 2710 than when using one or more other spray devices.

Figure 28:
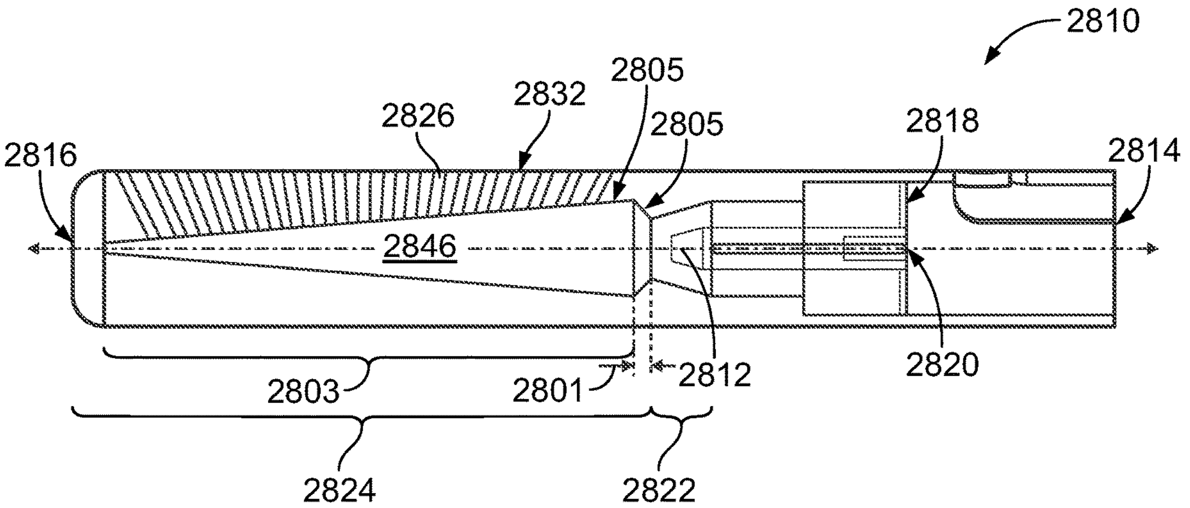
FIG. 28 illustrates a side view of another embodiment of an atomizing spray nozzle device.

FIG. 28 illustrates a side view of another embodiment of an atomizing spray nozzle device 2810. The spray nozzle device 2810 is designed to provide a conduit for at least two fluid media, as described above in connection with other spray nozzle devices. The spray nozzle device 2810 can represent or be used in place of the spray nozzle device 110 shown in FIGS. 1 through 4. The spray nozzle device 2810 has an elongated shape along an axis 2812 from a feed end 2814 to an opposite delivery end 2816. The spray nozzle device 2810 is formed from one or more housings that form an interior plenum chamber 2846 extending between the feed end 2814 and the delivery end 2816. The interior plenum chamber 2846 directs the flow of the materials forming the two-phase mixture of ceramic-liquid droplets in a carrier gas through and out of the spray nozzle device 2810.

The spray nozzle device 2810 includes several inlets 2818, 2820 extending inward from the feed end 2814 toward (but not extending all the way to) the delivery end 2816. These inlets 2818, 2820 receive different phases of the materials that are atomized within the spray nozzle device 2810 to form the two-phase mixture of ceramic-liquid droplets in a carrier gas that is sprayed onto the surfaces of the machine 200, as described herein. In the illustrated embodiment, one inlet 2818 extends around, encircles, or circumferentially surrounds the other inlet 2820, also as described herein. Alternatively, the inlets 2818, 2820 may be disposed in another spatial relationship and/or another number of inlets may be provided.

The spray nozzle device 2810 includes an atomizing zone housing 2822 that holds part of the plenum chamber 2846 that is fluidly coupled with the inlets 2818, 2820. For example, the inlets 2818, 2820 may terminate and be open at or within an interior chamber of the housing 2822.

The inlets 2818, 2820 can deliver gas and two-phase fluids or slurries to the plenum chamber 2846 in the atomizing zone housing 2822, as described herein. The gas accelerates the two-phase droplets from the atomizing zone housing 2822 to a portion of the plenum chamber 2846 in a manifold or plenum housing portion 2824. In one embodiment, atomizing is complete before the droplets enter the plenum housing portion 2824.

The plenum housing portion 2824 is coupled with the atomizing zone housing 2822. The plenum housing portion 2824 extends from the atomizing zone housing 2822 to the delivery end 2816 of the spray nozzle device 2810. The plenum housing portion 2824 receives the two-phase mixture of ceramic-liquid droplets in a carrier gas from the atomizing zone housing 2822.

One or more delivery nozzles 2826 are fluidly coupled with the plenum chamber 2846 in the plenum housing portion 2824. In the illustrated embodiment, the spray nozzle device 2810 includes twenty-one nozzles 2826, although a single nozzle or a different number of two or more nozzles may be provided instead.

The nozzles 2826 terminate at openings 2832 that provide outlets through which the two-phase mixture of ceramic-liquid droplets in a carrier gas is delivered from the plenum housing portion 2824 out of the device 2810 and onto one or more surfaces of the target object of the machine 200 as a coating or restorative coating on the machine 200. The openings 2832 can be circular openings, or have another shape. The nozzles 2826 can deliver the two-phase mixture of ceramic-liquid droplets in a carrier gas at pressures of ten to three hundred pounds per square inch and, in one embodiment, as a pressure of less than one hundred pounds per square inch for both the mixture delivery and the gas delivery. In one embodiment, the nozzles 2826 are small such that the nozzles 2826 further atomize the two-phase mixture of ceramic-liquid droplets in a carrier gas, as described herein. The gas moving through the delivery spray device 2810 can carry the two-phase mixture of ceramic-liquid droplets in a carrier gas out of the nozzles 2826 toward the surfaces onto which the restorative coating is being formed by the two-phase mixture of ceramic-liquid droplets in a carrier gas. Each of the nozzles 2826 may have the same (within manufacturing tolerances) ratio of length of the nozzle 2826 (from the intersection between the plenum chamber 2846 to the opening 2832) to the diameter of the opening 2832 to provide for a more even distribution of the two-phase mixture of ceramic-liquid droplets in a carrier gas across all nozzles 2826 (relative to one or more other spray devices described herein).

The nozzles 2826 are oriented at different angles with respect to the center axis 2812, similar to the nozzles 1426 shown in FIG. 14. These orientations of the delivery nozzles 2826 provide for a fan-like arrangement of the nozzles 2826. This arrangement can provide for a larger coverage area that is sprayed by the multi-phase mixture exiting the nozzles 2826, relative to one or more other orientations of the nozzles 2826.

In the illustrated embodiment, plenum chamber 2846 has an increasing taper portion 2801 and a decreasing taper portion 2803 in the housing portion 2824. The cross-sectional area of the plenum chamber 2846 increases in the increasing portion 2801 as the locations along the center axis 2812 from the feed end 2814 increase. The cross-sectional area of the plenum chamber 2846 decreases in the decreasing portion 2803 as the locations along the center axis 2812 from the feed end 2814 increase, similar to the plenum chamber 1246 described above. The inventors have discovered that combining the increasing and decreasing taper portions 2801, 2803 directly next to each other can provide for a more uniform distribution of the two-phase mixture of ceramic-liquid droplets in a carrier gas through the nozzles 2826 relative to plenum chambers that do not include the increasing and decreasing taper portions 2801, 2803 directly abutting each other.

Figure 29:
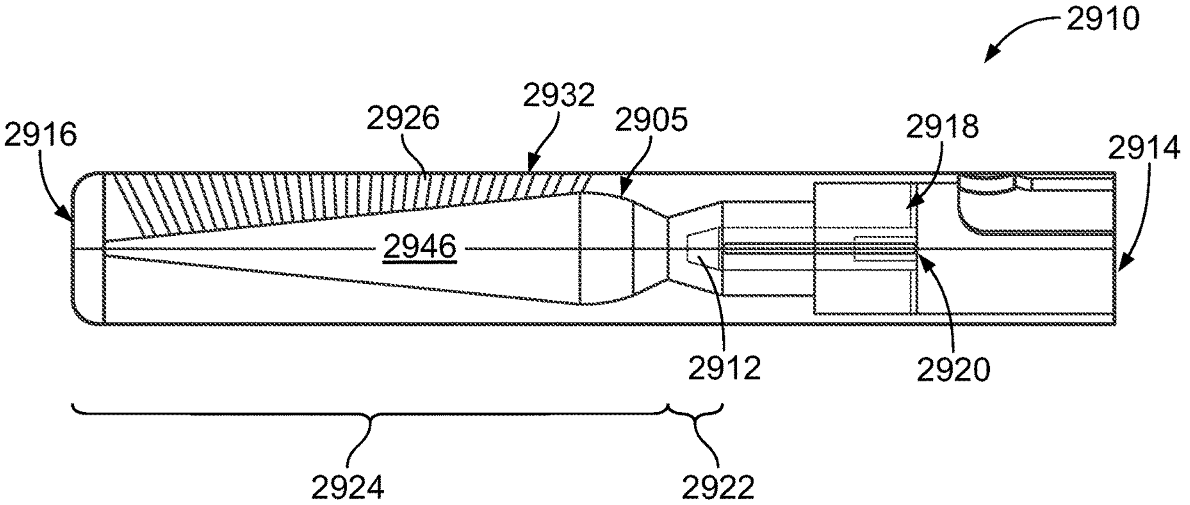
FIG. 29 illustrates a side view of another embodiment of an atomizing spray nozzle device.

FIG. 29 illustrates a side view of another embodiment of an atomizing spray nozzle device 2910. The spray nozzle device 2910 is designed to provide a conduit for at least two fluid media, as described above in connection with other spray nozzle devices. The spray nozzle device 2910 can represent or be used in place of the spray nozzle device 110 shown in FIGS. 1 through 4. The spray nozzle device 2910 has an elongated shape along an axis 2912 from a feed end 2914 to an opposite delivery end 2916. The spray nozzle device 2910 is formed from one or more housings that form an interior plenum chamber 2946 extending between the feed end 2914 and the delivery end 2916. The interior plenum chamber 2946 directs the flow of the materials forming the two-phase mixture of ceramic-liquid droplets in a carrier gas through and out of the spray nozzle device 2910.

The spray nozzle device 2910 includes several inlets 2918, 2920 extending inward from the feed end 2914 toward (but not extending all the way to) the delivery end 2916. These inlets 2918, 2920 receive different phases of the materials that are atomized within the spray nozzle device 2910 to form the airborne mixture that is sprayed onto the surfaces of the machine 200, as described herein. In the illustrated embodiment, one inlet 2918 extends around, encircles, or circumferentially surrounds the other inlet 2920, also as described herein. Alternatively, the inlets 2918, 2920 may be disposed in another spatial relationship and/or another number of inlets may be provided.

The spray nozzle device 2910 includes an atomizing zone housing 2922 that holds part of the plenum chamber 2946 that is fluidly coupled with the inlets 2918, 2920. For example, the inlets 2918, 2920 may terminate and be open at or within an interior chamber of the housing 2922.

The inlets 2918, 2920 can deliver gas and two-phase fluids or slurries to the plenum chamber 2946 in the atomizing zone housing 2922, as described herein. The gas accelerates the two-phase droplets from the atomizing zone housing 2922 to a portion of the plenum chamber 2946 in a manifold or plenum housing portion 2924. In one embodiment, atomizing is complete before the droplets enter the plenum housing portion 2924.

The plenum housing portion 2924 is coupled with the atomizing zone housing 2922. The plenum housing portion 2924 extends from the atomizing zone housing 2922 to the delivery end 2916 of the spray nozzle device 2910. The plenum housing portion 2924 receives the two-phase mixture of ceramic-liquid droplets in a carrier gas from the atomizing zone housing 2922.

One or more delivery nozzles 2926 are fluidly coupled with the plenum chamber 2946 in the plenum housing portion 2924. In the illustrated embodiment, the spray nozzle device 2910 includes twenty-one nozzles 2926, although a single nozzle or a different number of two or more nozzles may be provided instead.

The nozzles 2926 terminate at openings 2932 that provide outlets through which the two-phase mixture of ceramic-liquid droplets in a carrier gas is delivered from the plenum housing portion 2924 out of the device 2910 and onto one or more surfaces of the target object of the machine 200 as a coating or restorative coating on the machine 200. The openings 2932 can be circular openings, or have another shape. The nozzles 2926 can deliver the two-phase mixture of ceramic-liquid droplets in a carrier gas at pressures of ten to three hundred pounds per square inch and, in one embodiment, as a pressure of less than one hundred pounds per square inch for both the mixture delivery and the gas delivery. In one embodiment, the nozzles 2926 are small such that the nozzles 2926 further atomize the two-phase mixture of ceramic-liquid droplets in a carrier gas, as described herein. The gas moving through the delivery spray device 2910 can carry the two-phase mixture of ceramic-liquid droplets in a carrier gas out of the nozzles 2926 toward the surfaces onto which the restorative coating is being formed by the two-phase mixture of ceramic-liquid droplets in a carrier gas. Each of the nozzles 2926 may have the same (within manufacturing tolerances) ratio of length of the nozzle 2926 (from the intersection between the plenum chamber 2946 to the opening 2932) to the diameter of the opening 2932 to provide for a more even distribution of the two-phase mixture of ceramic-liquid droplets in a carrier gas across all nozzles 2926 (relative to one or more other spray devices described herein).

The nozzles 2926 are oriented at different angles with respect to the center axis 2912, similar to the nozzles 1426 shown in FIG. 14. These orientations of the delivery nozzles 2926 provide for a fan-like arrangement of the nozzles 2926. This arrangement can provide for a larger coverage area that is sprayed by the multi-phase mixture exiting the nozzles 2926, relative to one or more other orientations of the nozzles 2926.

In the illustrated embodiment, plenum chamber 2946 has an increasing taper portion followed by a decreasing taper portion along the length of the plenum chamber 2946 toward the delivery end 2916, similar to the plenum chamber 2846 described above. In contrast to the plenum chamber 2846, however, the plenum chamber 2946 includes a curved outer surface. The plenum chamber 2846 shown in FIG. 28 has flat, conical outer surfaces 2805 inside the spray device 2810. The plenum chamber 2946 shown in FIG. 29, however, has a curved outer surface 2905. This curved shape of the plenum chamber 2946 assist in providing for a more even flow of the two-phase mixture of ceramic-liquid droplets in a carrier gas or components of the two-phase mixture of ceramic-liquid droplets in a carrier gas through the plenum chamber 2946 relative to plenum chambers having flatter surfaces.

Figure 30:
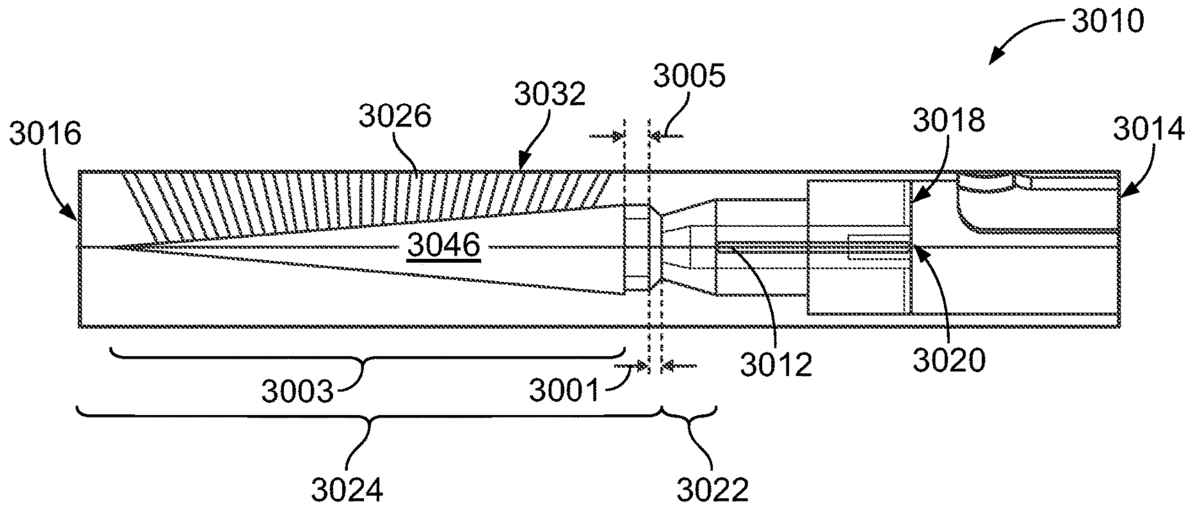
FIG. 30 illustrates a side view of another embodiment of an atomizing spray nozzle device.

FIG. 30 illustrates a side view of another embodiment of an atomizing spray nozzle device 3010. The spray nozzle device 3010 is designed to provide a conduit for at least two fluid media, as described above in connection with other spray nozzle devices. The spray nozzle device 3010 can represent or be used in place of the spray nozzle device 110 shown in FIGS. 1 through 4. The spray nozzle device 3010 has an elongated shape along an axis 3012 from a feed end 3014 to an opposite delivery end 3016. The spray nozzle device 3010 is formed from one or more housings that form an interior plenum chamber 3046 extending between the feed end 3014 and the delivery end 3016. The interior plenum chamber 3046 directs the flow of the materials forming the two-phase mixture of ceramic-liquid droplets in a carrier gas through and out of the spray nozzle device 3010.

The spray nozzle device 3010 includes several inlets 3018, 3020 extending inward from the feed end 3014 toward (but not extending all the way to) the delivery end 3016. These inlets 3018, 3020 receive different phases of the materials that are atomized within the spray nozzle device 3010 to form the airborne mixture that is sprayed onto the surfaces of the machine 200, as described herein. In the illustrated embodiment, one inlet 3018 extends around, encircles, or circumferentially surrounds the other inlet 3020, also as described herein. Alternatively, the inlets 3018, 3020 may be disposed in another spatial relationship and/or another number of inlets may be provided.

The spray nozzle device 3010 includes an atomizing zone housing 3022 that holds part of the plenum chamber 3046 that is fluidly coupled with the inlets 3018, 3020. For example, the inlets 3018, 3020 may terminate and be open at or within an interior chamber of the housing 3022.

The inlets 3018, 3020 can deliver gas and two-phase fluids or slurries to the plenum chamber 3046 in the atomizing zone housing 3022, as described herein. The gas accelerates the two-phase droplets from the atomizing zone housing 3022 to a portion of the plenum chamber 3046 in a manifold or plenum housing portion 3024. In one embodiment, atomizing is complete before the droplets enter the plenum housing portion 3024.

The plenum housing portion 3024 is coupled with the atomizing zone housing 3022. The plenum housing portion 3024 extends from the atomizing zone housing 3022 to the delivery end 3016 of the spray nozzle device 3010. The plenum housing portion 3024 receives the two-phase mixture of ceramic-liquid droplets in a carrier gas from the atomizing zone housing 3022.

One or more delivery nozzles 3026 are fluidly coupled with the plenum chamber 3046 in the plenum housing portion 3024. In the illustrated embodiment, the spray nozzle device 3010 includes twenty-one nozzles 3026, although a single nozzle or a different number of two or more nozzles may be provided instead.

The nozzles 3026 terminate at openings 3032 that provide outlets through which the two-phase mixture of ceramic-liquid droplets in a carrier gas is delivered from the plenum housing portion 3024 out of the device 3010 and onto one or more surfaces of the target object of the machine 200 as a coating or restorative coating on the machine 200. The openings 3032 can be circular openings, or have another shape. The nozzles 3026 can deliver the two-phase mixture of ceramic-liquid droplets in a carrier gas at pressures of ten to three hundred pounds per square inch and, in one embodiment, as a pressure of less than one hundred pounds per square inch for both the mixture delivery and the gas delivery. In one embodiment, the nozzles 3026 are small such that the nozzles 3026 further atomize the two-phase mixture of ceramic-liquid droplets in a carrier gas, as described herein. The gas moving through the delivery spray device 3010 can carry the mixed-phase mixture out of the nozzles 3026 toward the surfaces onto which the restorative coating is being formed by the mixed-phase mixture. Each of the nozzles 3026 may have the same (within manufacturing tolerances) ratio of length of the nozzle 3026 (from the intersection between the plenum chamber 3046 to the opening 3032) to the diameter of the opening 3032 to provide for a more even distribution of the mixed-phase mixture across all nozzles 3026 (relative to one or more other spray devices described herein).

The nozzles 3026 are oriented at different angles with respect to the center axis 3012, similar to the nozzles 1426 shown in FIG. 14. These orientations of the delivery nozzles 3026 provide for a fan-like arrangement of the nozzles 3026. This arrangement can provide for a larger coverage area that is sprayed by the multi-phase mixture exiting the nozzles 3026, relative to one or more other orientations of the nozzles 3026.

In the illustrated embodiment, plenum chamber 3046 has an increasing taper portion 3001 and a decreasing taper portion 3003 that are separated by a constant area portion 3005 along the length of the plenum chamber 3046 toward the delivery end 3016. The increasing taper portion 3001 can be similar to the increasing taper portion 2801 of the plenum chamber 2846 and the decreasing taper portion 3003 can be similar to the decreasing taper portion 2803 of the plenum chamber 2846 shown in FIG. 28.

In contrast to the plenum chamber 2846, however, the plenum chamber 3046 also includes the constant cross-sectional area portion 3005 between the increasing and decreasing taper portions 3001, 3003. The constant cross-sectional area portion 3005 intersects with each of the increasing and decreasing taper portions 3001, 3003. The constant cross-sectional area portion 3005 includes a constant cross-sectional area (in planes that are perpendicular to the center axis 3012) in all locations in the portion 3005. The constant cross-sectional area portion 3005 forms a diffusion zone in the plenum chamber 3046 that allows for the components of the two-phase mixture of ceramic-liquid droplets in a carrier gas to further mix with each other. This can result in a more homogenous or even mixing of the components in the plenum chamber 3046 relative to plenum chambers that do not include the constant area portion 3005.

Figure 31:
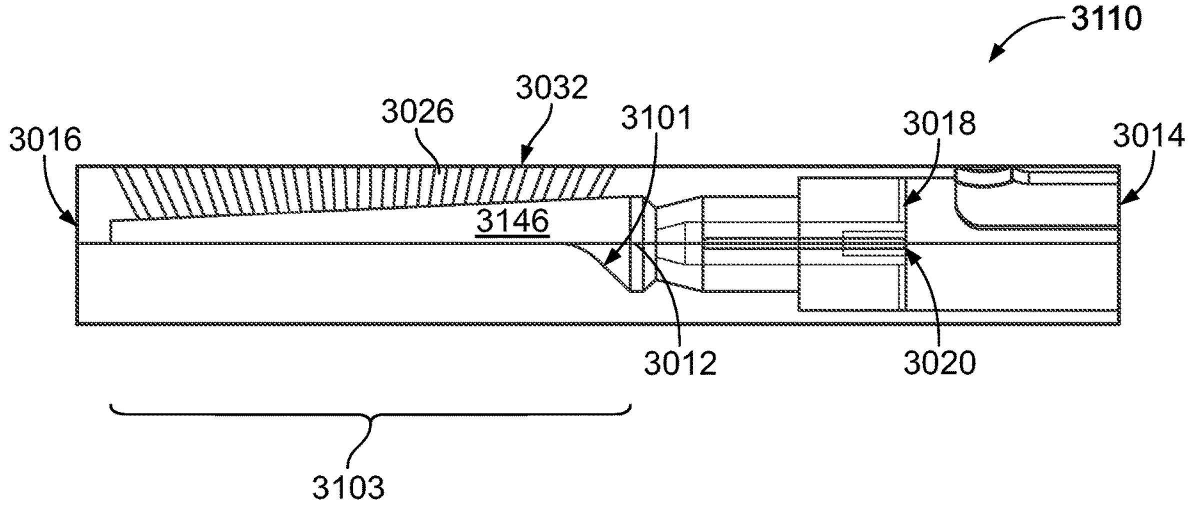
FIG. 31 illustrates a side view of another embodiment of an atomizing spray nozzle device.

FIG. 31 illustrates a side view of another embodiment of an atomizing spray nozzle device 3110. The spray nozzle device 3110 is designed to provide a conduit for at least two fluid media, as described above in connection with other spray nozzle devices. The spray nozzle device 3110 can represent or be used in place of the spray nozzle device 110 shown in FIGS. 1 through 4. The spray nozzle device 3110 includes many of the same components of other spray nozzle devices, as shown in FIG. 31.

One difference between the spray nozzle device 3110 and other spray nozzle devices shown and described herein is the size and shape of a plenum chamber 3146 of the spray nozzle device 3110. In contrast to other spray nozzle devices, the plenum chamber 3146 does not have a symmetrical shape around a center axis 3112 of the device 3110. The plenum chamber 3146 has an asymmetrical shape as shown in FIG. 31. This asymmetrical shape forms an impingement plate 3101 in the plenum chamber 3146. The impingement plate 3101 is a surface on a side of the center axis 3112 that is opposite of the nozzles 3026. The impingement plate 3101 is oriented at an acute angle with respect to the center axis 3112. This plate 3101 can assist with further mixing of the components of the two-phase mixture of ceramic-liquid droplets in a carrier gas in the plenum chamber 3146. This can result in a more homogenous or even mixing of the components in the plenum chamber 3146 relative to plenum chambers that do not include the impingement plate 3101.

Figure 32:
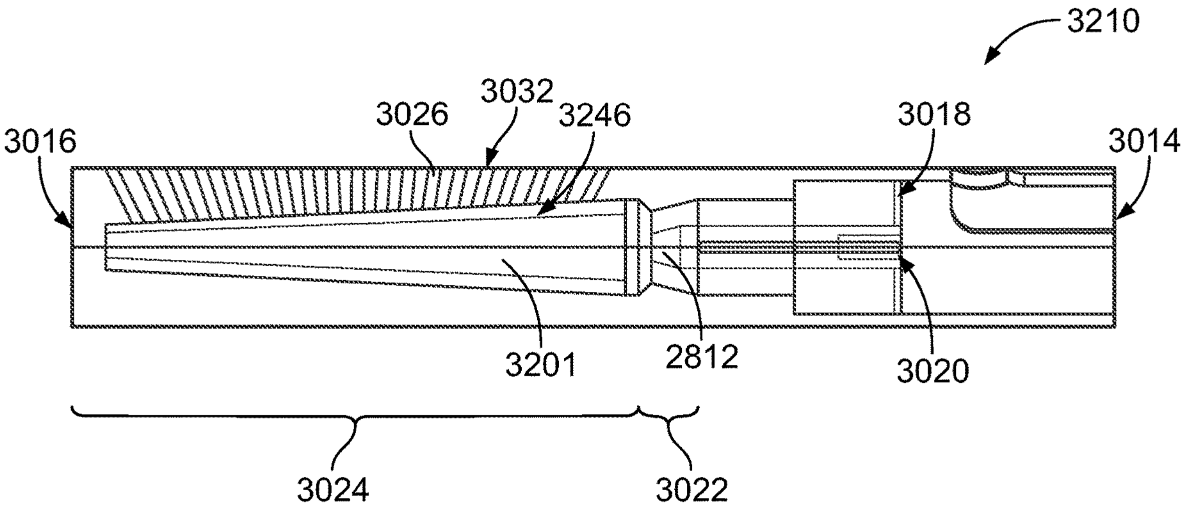
FIG. 32 illustrates a side view of another embodiment of an atomizing spray nozzle device.

FIG. 32 illustrates a side view of another embodiment of an atomizing spray nozzle device 3210. The spray nozzle device 3210 is designed to provide a conduit for at least two fluid media, as described above in connection with other spray nozzle devices. The spray nozzle device 3210 can represent or be used in place of the spray nozzle device 110 shown in FIGS. 1 through 4. The spray nozzle device 3210 includes many of the same components of other spray nozzle devices, as shown in FIG. 32.

One difference between the spray nozzle device 3210 and other spray nozzle devices shown and described herein is the shape of a plenum chamber 3246 of the spray nozzle device 3210. In contrast to other spray nozzle devices, the plenum chamber 3246 has an annular geometry. An internal body 3201 is located in the plenum chamber 3246 with the plenum chamber 3246 encircling or surrounding the internal body 3201. In the illustrated example, the internal body 3201 has a conical shape, but optionally may have a cylindrical or other shape. The internal body 3201 can extend along the entire length of the plenum chamber 3246 (as shown in FIG. 32), or may extend only part of the way along the length of the plenum chamber 3246. The internal body 3201 can be coupled with the delivery end 3016 of the housing of the device 3210, or may be connected with the housing in another location. The plenum chamber 3246 is fluidly coupled with the inlets 3018, 3020 so that the multi-phase components forming the mixture are received into the plenum chamber 3246 around the internal body 3201.

The annular plenum chamber 3246 can assist in delivering or directing the mixture in the device 3210 to the channels of the nozzles 3026. The mixture has less space to flow or move within in the plenum chamber 3246 due to the presence of the internal body 3201. This can increase the pressure of the airborne mixture within the plenum chamber 3246 and/or reduce the pressure drop in the airborne mixture between the pressure at which the component(s) is or are introduced into the device 3210 and the pressure at which the mixture flows into the nozzles 3026.

Figure 33:
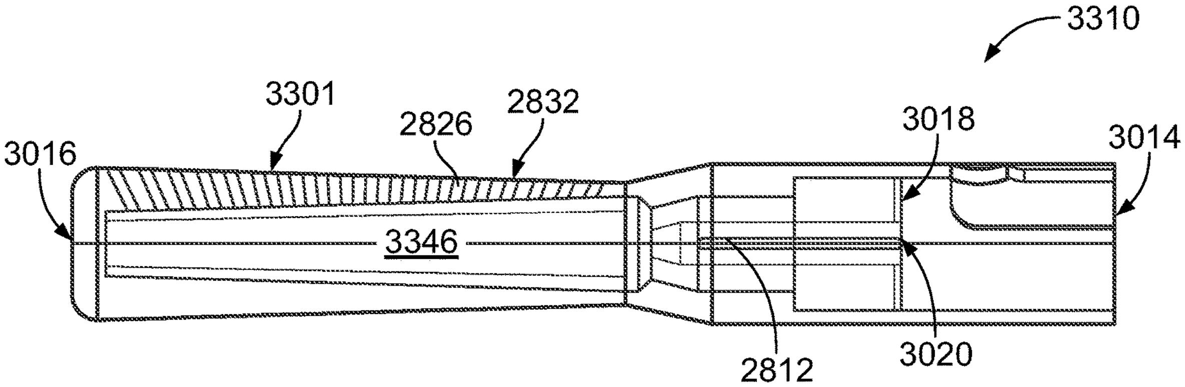
FIG. 33 illustrates a side view of another embodiment of an atomizing spray nozzle device.

FIG. 33 illustrates a side view of another embodiment of an atomizing spray nozzle device 3310. The spray nozzle device 3310 is designed to provide a conduit for at least two fluid media, as described above in connection with other spray nozzle devices. The spray nozzle device 3310 can represent or be used in place of the spray nozzle device 110 shown in FIGS. 1 through 4. The spray nozzle device 3310 includes many of the same components of other spray nozzle devices, as shown in FIG. 33.

One difference between the spray nozzle device 3310 and other spray nozzle devices shown and described herein include the decreasing taper size of a plenum chamber 3346 and the increasing taper size of an outer surface 3301 of the housing of the device 3310. The plenum chamber 3346 has a decreasing taper size along the length of the device 3310, while the exterior surface 3301 of the device 3310 has an increasing taper size along the same length of the device 3310. This results in the plenum chamber 3346 being closer to the exterior surface 3301 at locations that are closer to the feed end 3014 (or farther from the delivery end 3016), and the plenum chamber 3346 being farther from the exterior surface 3301 at locations that are farther from the feed end 3014 (or closer to the delivery end 3016).

The different tapered shapes of the plenum chamber 3346 and outer surface 3301 result in the length of the nozzles 2826 that are closer to the feed end 3014 being shorter than the nozzles 2826 that are closer to the delivery end 3016. In the illustrated embodiment, no two nozzles 2826 have the same length. This can result in the mixture exiting the device 3310 from the nozzles 2826 that are closer to the feed end 3014 having a greater pressure than the mixture exiting the device 3310 from the nozzles 2826 that are closer to the delivery end 3016. The device 3310 can be useful in situations where surfaces in the machine 200 that are receiving the coating from the shorter nozzles 2826 are farther from the device 3310 than other surfaces.

Figure 34:
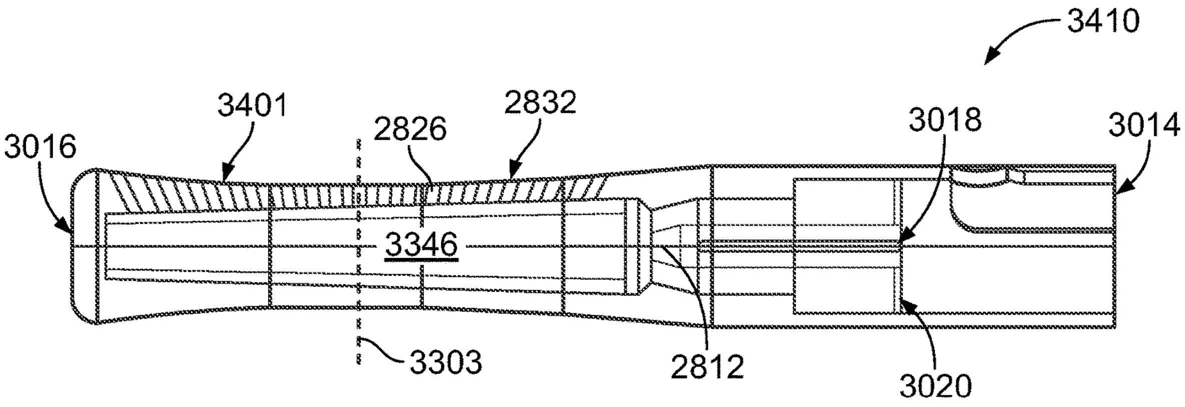
FIG. 34 illustrates a side view of another embodiment of an atomizing spray nozzle device.

FIG. 34 illustrates a side view of another embodiment of an atomizing spray nozzle device 3410. The spray nozzle device 3410 is designed to provide a conduit for at least two fluid media, as described above in connection with other spray nozzle devices. The spray nozzle device 3410 can represent or be used in place of the spray nozzle device 110 shown in FIGS. 1 through 4. The spray nozzle device 3410 includes many of the same components of other spray nozzle devices, as shown in FIG. 34.

One difference between the spray nozzle device 3410 and other spray nozzle devices shown and described herein include an outer surface 3401 of the housing of the device 3410 having a saddle, bowed, or concave shape, as shown in FIG. 34. This results in the lengths of the nozzles 2826 that are closer to a middle location 3303 of the array of nozzles 2826 being shorter than the lengths of the nozzles 2826 that are farther from the middle location 3303. This can result in the mixture exiting the device 3410 from the nozzles 2826 that are closer to the middle location 3303 having a greater pressure than the mixture exiting the device 3410 from the nozzles 2826 that are farther from the middle location 3303.

Figure 35:
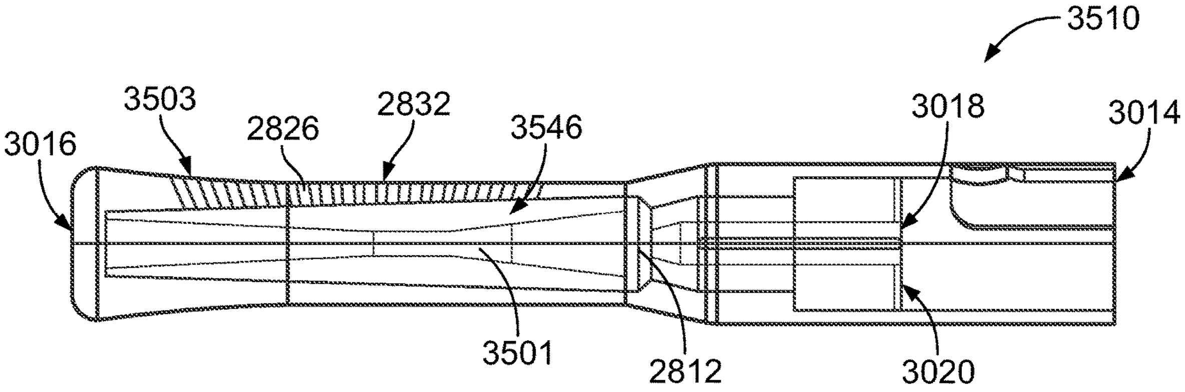
FIG. 35 illustrates a side view of another embodiment of an atomizing spray nozzle device.

FIG. 35 illustrates a side view of another embodiment of an atomizing spray nozzle device 3510. The spray nozzle device 3510 is designed to provide a conduit for at least two fluid media, as described above in connection with other spray nozzle devices. The spray nozzle device 3510 can represent or be used in place of the spray nozzle device 110 shown in FIGS. 1 through 4. The spray nozzle device 3510 includes many of the same components of other spray nozzle devices, as shown in FIG. 35.

In contrast to some of the other spray nozzle devices described herein, the spray nozzle device 3510 includes an annular plenum chamber 3546 having a decreasing taper shape and that includes an interior body or mandrel 3501. Additionally, an exterior or outside surface 3503 of the housing of the spray nozzle device 3510 is curved outward at locations that are closer to the delivery end 3016 of the device 3510. The interior body or mandrel 3501 may be similar to the interior body or mandrel 3201 shown in FIG. 32. One difference between the interior bodies or mandrels 3501, 3201 is that the interior body or mandrel 3501 has a curved or concave outer surface. This causes the plenum chamber 3546 to have a larger size at or near the middle of the length of the interior body or mandrel 3501 than at other locations along the length of the interior body or mandrel 3501. The curved surface 3503 of the device 3510 causes the nozzles 2826 that are closer to the delivery end 3016 to be longer than the nozzles 2826 that are farther from the delivery end 3016. As a result, the shorter nozzles 2826 can deliver the mixture at a higher pressure than the longer nozzles 2826.

In one embodiment, an atomizing spray nozzle device includes an atomizing zone housing portion configured to receive different phases of materials used to form a coating. The atomizing zone housing is shaped to mix the different phases of the materials into a two-phase mixture of ceramic-liquid droplets in a carrier gas. The device also includes a plenum housing portion fluidly coupled with the atomizing housing portion and extending from the atomizing housing portion to a delivery end. The plenum housing portion includes an interior plenum chamber that is elongated along a center axis. The plenum is configured to receive the two-phase mixture of ceramic-liquid droplets in the carrier gas from the atomizing zone. The device also includes one or more delivery nozzles fluidly coupled with the plenum chamber. The one or more delivery nozzles provide one or more outlets from which the two-phase mixture of ceramic-liquid droplets in the carrier gas is delivered onto one or more surfaces of a target object as a coating on the target object.

Optionally, the plenum housing portion has a tapered shape that increases in cross-sectional size along the center axis from the atomizing zone housing portion to the delivery end.

Optionally, the plenum chamber has a tapered shape that increases in cross-sectional size along the center axis from the atomizing zone housing portion toward the delivery end.

Optionally, the one or more delivery nozzles include plural nozzles that are elongated along directions oriented at different angles with respect to the center axis.

Optionally, the plenum housing portion has a convex bent shape from the atomizing housing portion to the delivery end.

Optionally, the plenum chamber has a convex bent shape from the atomizing housing portion to the delivery end.

Optionally, the plenum chamber has a first cross-sectional area at a first location at an intersection between the atomizing zone housing and the plenum housing portion, a second cross-sectional area at a second location that is closer to the delivery end, and a third cross-sectional area at a third location that is between the first and second locations, where the first and second cross-sectional areas are larger than the third cross-sectional area.

Optionally, the plenum chamber has a first cross-sectional area at a first location at an intersection between the atomizing zone housing and the plenum housing portion, a second cross-sectional area at a second location that is closer to the delivery end, and a third cross-sectional area at a third location that is between the first and second locations, where the first cross-sectional area is smaller than the second and third cross-sectional areas and the third cross-sectional area is smaller than the second cross-sectional area.

Optionally, the plenum housing portion has an interior surface that defines the plenum chamber, and where the interior surface has a first conical portion that tapers outward and a second conical portion that tapers inward upstream of the one or more delivery nozzles.

Optionally, the interior surface has a cylindrical portion that extends from the first conical portion to the second conical portion.

Optionally, the plenum housing portion has an interior surface that defines the plenum chamber. The interior surface can have having a curved portion that bows outward away from the center axis upstream of the one or more delivery nozzles.

Optionally, the plenum housing portion has an interior surface that defines the plenum chamber and the plenum chamber has an asymmetric shape around the center axis.

Optionally, the interior surface of the plenum housing includes an impingement surface oriented at an acute angle to the center axis.

Optionally, the plenum chamber in the housing portion is an annular chamber that surrounds an interior body inside the plenum chamber.

Optionally, the plenum housing portion includes an exterior surface that curves outward from the center axis.

Optionally, the atomizing zone housing portion, the plenum housing portion, and the one or more delivery nozzles are sized to be inserted into one or more of a stage one nozzle borescope opening or a stage two nozzle borescope opening of a turbine engine.

Optionally, the plenum in the plenum housing portion provides for delivery of droplets of the two-phase mixture of ceramic-liquid droplets in the carrier gas from the one or more delivery nozzles that creates a spray of the droplets and a uniform coverage of the coating on the target object.

Optionally, the one or more delivery nozzles are configured to spray the two-phase mixture of ceramic-liquid droplets in the carrier gas onto the one or more surfaces of the target object to apply the coating as a uniform coating.

In one embodiment, a system includes the atomizing spray nozzle device and an equipment controller configured to control rotation of a turbine engine into which the atomizing spray nozzle device is inserted during spraying of the two-phase mixture of ceramic-liquid droplets in the carrier gas by the atomizing spray nozzle device into the turbine engine.

In one embodiment, a system includes the atomizing spray nozzle device and a spray controller configured to control one or more of a pressure of a two-phase mixture of ceramic-liquid droplets in a carrier gas provided to the atomizing spray nozzle device, a pressure of a gas provided to the atomizing spray nozzle device, a flow rate of the slurry provided to the atomizing spray nozzle device, a flow rate of the gas provided to the atomizing spray nozzle device, a temporal duration at which the slurry is provided to the atomizing spray nozzle device, a temporal duration at which the gas is provided to the atomizing spray nozzle device, a time at which the slurry is provided to the atomizing spray nozzle device, or a time at which the gas provided to the atomizing spray nozzle device.

As used herein, an element or step recited in the singular and proceeded with the word “a” or “an” should be understood as not excluding plural of said elements or steps, unless such exclusion is explicitly stated. Furthermore, references to “one embodiment” of the presently described subject matter are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An atomizing spray nozzle device comprising:

a housing having a feed end section that includes a first inlet disposed inside a second inlet with at least one of the first inlet and the second inlet coupled to a slurry source that includes a slurry of solid particles and a liquid and the other one of the first inlet and the second inlet coupled to a gas source, a delivery end section that is opposite the feed end section and includes two or more delivery nozzles that extend through the housing, and an intermediate section disposed between the feed end section and the delivery end section, wherein the housing is elongated along a flow direction that extends from the feed end section to the delivery end section, the housing having an inner wall that defines:

an atomizing zone housing portion that includes the feed end section and an upstream portion of the intermediate section, the atomizing zone housing portion defining a first atomizing zone cross-sectional area at the feed end section and a second atomizing zone cross-sectional area at the upstream portion of the intermediate section, the first atomizing zone cross-sectional area being larger than the second atomizing zone cross-sectional area such that the atomizing zone housing portion has a decreasing taper in the flow direction; and a plenum housing portion that includes the delivery end section and a downstream portion of the intermediate section, the plenum housing portion fluidly coupled with the atomizing zone housing portion, the plenum housing portion forming an interior plenum chamber that is fluidly coupled to the two or more delivery nozzles, wherein a first portion of the plenum housing portion has a tapered shape that increases or decreases in cross-sectional size along the flow direction.

2. The atomizing spray nozzle device of claim 1, wherein the two or more delivery nozzles are at different angles with respect to the flow direction.

3. The atomizing spray nozzle device of claim 1, wherein the two or more delivery nozzles include delivery nozzles located through the housing on one side along a length of the housing.

4. The atomizing spray nozzle device of claim 1, wherein the two or more delivery nozzles are linearly aligned along a line that is parallel to the flow direction or on a common side of the housing.

5. The atomizing spray nozzle device of claim 1, wherein the delivery end section has a convex portion, and wherein the two or more delivery nozzles are disposed on the convex portion such that the two or more delivery nozzles are oriented in an outwardly extending fan-shaped arrangement.

6. The atomizing spray nozzle device of claim 1, wherein the plenum housing portion further includes a second portion having a tapered shape that decreases in cross-sectional size along the flow direction.

7. The atomizing spray nozzle device of claim 1, wherein the plenum housing portion has a convex bent shape.

8. The atomizing spray nozzle device of claim 1, wherein the plenum housing portion has an interior surface that defines the interior plenum chamber, the interior surface having a curved portion that bows outward.

9. The atomizing spray nozzle device of claim 1, wherein the interior plenum chamber has a first cross-sectional area at a first location at an intersection between the atomizing zone housing portion and the plenum housing portion, a second cross-sectional area at a second location that is farther from the feed end section, and a third cross-sectional area at a third location that is between the first location and the second location, wherein the first cross-sectional area and the second cross-sectional area are larger than the third cross-sectional area.

10. The atomizing spray nozzle device of claim 1, wherein the interior plenum chamber has a first cross-sectional area at a first location at an intersection between the atomizing zone housing portion and the plenum housing portion, a second cross-sectional area at a second location that is farther from the feed end section, and a third cross-sectional area at a third location that is between the first location and the second location, wherein the first cross-sectional area is smaller than the second cross-sectional area and the third cross-sectional area is smaller than the second cross-sectional area.

11. The atomizing spray nozzle device of claim 1, wherein the interior plenum chamber has a first cross-sectional area at a first location at an intersection between the atomizing zone housing portion and the plenum housing portion, a second cross-sectional area at a second location that is farther from the feed end section, and a third cross-sectional area at a third location that is between the first location and the second location, wherein the second cross-sectional area and the third cross-sectional area are larger than the first cross-sectional area.

12. An atomizing spray nozzle device comprising:

a housing having a feed end section that includes a first inlet disposed inside a second inlet, a delivery end section that is opposite the feed end section and includes two or more delivery nozzles that extend through the housing, and an intermediate section disposed between the feed end section and the delivery end section, wherein the housing is elongated along a flow direction that extends from the feed end section to the delivery end section, wherein the two or more delivery nozzles have the same cross-sectional areas, the housing having an inner wall that defines:

an atomizing zone housing portion that includes the feed end section and an upstream portion of the intermediate section, the atomizing zone housing portion defining a first atomizing zone cross-sectional area at an the feed end section and a second atomizing zone cross-sectional area at the upstream portion of the intermediate section, the first atomizing zone cross-sectional area being larger than the second atomizing zone cross-sectional area such that the atomizing zone housing portion has a decreasing taper in the flow direction; and a plenum housing portion that includes the delivery end section and a downstream portion of the intermediate section, the plenum housing portion fluidly coupled with the atomizing zone housing portion, the plenum housing portion forming an interior plenum chamber that is fluidly coupled to the two or more delivery nozzles that extend through the housing at a radial direction, at least a portion of an interior surface of the plenum housing portion defined by a portion of the inner wall having a wall thickness that increases or decreases along the flow direction to define a tapered shape that decreases or increases in size along the flow direction.

13. The atomizing spray nozzle device of claim 12, wherein the tapered shape of the interior surface of the housing positions the two or more delivery nozzles at different angles with respect to the flow direction.

14. The atomizing spray nozzle device of claim 12, wherein the tapered shape of the interior surface of the plenum housing portion is such that a first delivery nozzle at one end of the housing is shorter than a second delivery nozzle at another end of the housing.

15. The atomizing spray nozzle device of claim 14, wherein the first delivery nozzle is closer to the feed end section than the second delivery nozzle.

16. An atomizing spray nozzle device comprising:

a housing having a feed end section that includes a first inlet disposed inside a second inlet, a delivery end section that is opposite the feed end section and includes two or more delivery nozzles that extend through the housing, and an intermediate section disposed between the feed end section and the delivery end section, wherein the housing is elongated along a flow direction that extends from the feed end section to the delivery end section, the housing having an inner wall that defines:

an atomizing zone housing portion that includes the feed end section and an upstream portion of the intermediate section, the atomizing zone housing portion defining a first atomizing zone cross-sectional area at an the feed end section and a second atomizing zone cross-sectional area at the upstream portion of the intermediate section, the first atomizing zone cross-sectional area being larger than the second atomizing zone cross-sectional area such that the atomizing zone housing portion has a decreasing taper in the flow direction; and a plenum housing portion that includes the delivery end section and a downstream portion of the intermediate section, the plenum housing portion fluidly coupled with the atomizing zone housing portion, the plenum housing portion forming an interior plenum chamber that is fluidly coupled to the two or more delivery nozzles, the two or more delivery nozzles extending through the housing at different angles with respect to the inner wall of the housing and forming a fan-like arrangement.

17. The atomizing spray nozzle device of claim 16, an interior surface of the atomizing zone housing portion has a tapered shape that decreases in cross sectional area from a larger cross sectional area at an interface between the atomizing zone housing portion and the first inlet and second inlet to a smaller cross-sectional are at an interface between the atomizing zone housing portion and the plenum housing portion to result in metering of a mixture through the atomizing spray nozzle device.

18. The atomizing spray nozzle device of claim 16, wherein the interior plenum chamber has an asymmetrical shape that forms an impingement plate.

19. The atomizing spray nozzle device of claim 16, wherein at least a portion of an interior surface of the plenum housing portion has a tapered shape that decreases or increases in size in the flow direction such that some of the two or more delivery nozzles are of a different length.

20. The atomizing spray nozzle device of claim 19, wherein the interior surface of the plenum housing portion has a first conical portion that tapers outward and a second conical portion that tapers inward upstream of the two or more delivery nozzles.

* * * * *